United States Patent [19]

Togai

[11] Patent Number: 5,704,340
[45] Date of Patent: Jan. 6, 1998

[54] EXCESS AIR RATE DETECTING APPARATUS AND AN EXCESS AIR RATE CONTROL APPARATUS FOR AN ENGINE

[75] Inventor: Kazuhide Togai, Tokyo, Japan

[73] Assignee: Mitsubishi Jidosha Kogyo Kabushiki Kaisha, Tokyo, Japan

[21] Appl. No.: 776,320

[22] PCT Filed: Jun. 3, 1996

[86] PCT No.: PCT/JP96/01498

§ 371 Date: Jan. 30, 1997

§ 102(e) Date: Jan. 30, 1997

[87] PCT Pub. No.: WO96/38660

PCT Pub. Date: Dec. 5, 1996

[30] Foreign Application Priority Data

| Jun. 2, 1995 | [JP] | Japan | 7-136995 |
| Jun. 13, 1995 | [JP] | Japan | 7-146614 |
| Jul. 6, 1995 | [JP] | Japan | 7-171057 |
| Jul. 6, 1995 | [JP] | Japan | 7-171058 |

[51] Int. Cl.$^6$ .................... F02D 41/14; F02M 25/07
[52] U.S. Cl. .................... 123/676; 123/571; 123/569
[58] Field of Search .................... 123/676, 568, 123/569, 571; 73/117.3; 60/605.2

[56] References Cited

U.S. PATENT DOCUMENTS

| 4,467,775 | 8/1984 | Buck et al. | 123/571 |
| 4,683,857 | 8/1987 | Yasuoka | 123/676 |
| 5,215,068 | 6/1993 | Kato | 123/676 |
| 5,377,651 | 1/1995 | Sczomak et al. | 123/571 |
| 5,390,649 | 2/1995 | Miener et al. | 123/676 |
| 5,520,161 | 5/1996 | Klopp | 123/676 |
| 5,601,068 | 2/1997 | Nozaki | 123/676 |
| 5,619,974 | 4/1997 | Rodefeld et al. | 123/571 |

FOREIGN PATENT DOCUMENTS

| 201832 | 9/1986 | Japan. |
| 271622 | 10/1989 | Japan. |

*Primary Examiner*—Willis R. Wolfe

[57] ABSTRACT

An excess air rate detecting apparatus and a control apparatus using the same are provided. In accordance with operating conditions of an engine (1) which includes an exhaust gas recirculation system, the detecting apparatus repeatedly detects the excess air rate of an air-fuel mixture supplied to the engine while exhaust gas is being circulated. The intake pressure of the engine is detected, the quantity of recirculation of the exhaust gas is estimated in accordance with at least the detected intake pressure, an equivalent intake air quantity of the engine is estimated by equivalent intake air quantity estimating means, and the excess air rate for the engine is estimated in accordance with the fuel supply quantity and the estimated equivalent intake air quantity. The estimated excess air rate is stored in storage means, the quantity of recirculation of the exhaust gas is estimated by the equivalent intake air quantity estimating means in accordance with at least the estimated exhaust gas recirculation quantity and the excess air rate stored in the storage means and estimated for the last cycle but a predetermined number of cycles, and the fuel supply quantity and/or exhaust gas recirculation quantity is adjusted by means of the estimated excess air rate to control the excess air rate for a target value.

32 Claims, 13 Drawing Sheets

F I G. 12
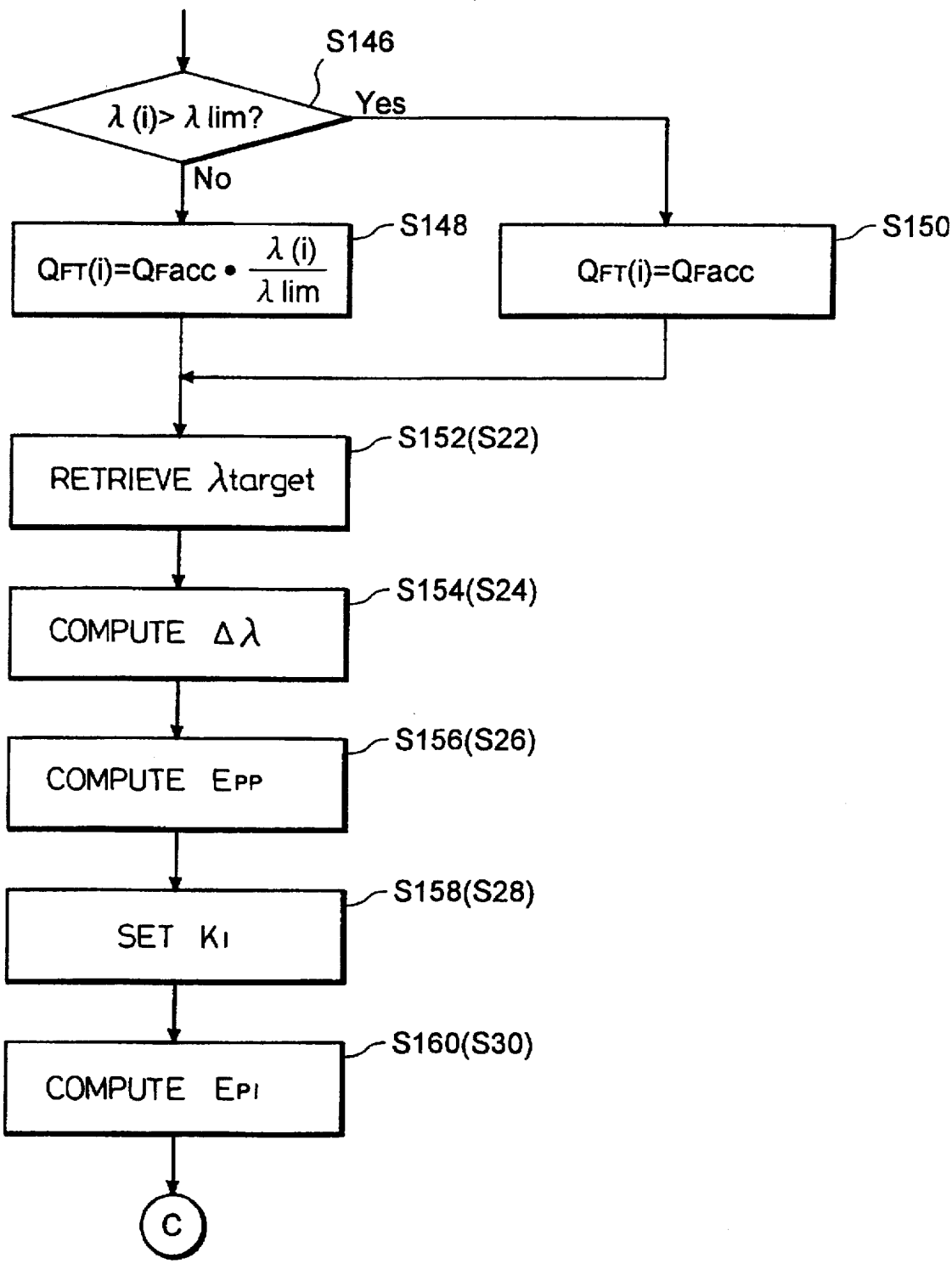

EXCESS AIR RATE DETECTING APPARATUS AND AN EXCESS AIR RATE CONTROL APPARATUS FOR AN ENGINE

TECHNICAL FIELD

The present invention relates to an excess air rate detecting apparatus and an excess air rate control apparatus for an engine, used in a fuel supply system or exhaust emission control device of an automotive diesel engine and the like.

BACKGROUND ART

Principal harmful exhaust components emitted from of a diesel engine include NOx that is produced by combustion at high temperature, besides black smoke, unburned HC, etc., which are attributable to uneven distribution of a fuel injected into a cylinder or some other causes. A reduction catalyst, such as the one used in a gasoline engine, cannot be used as NOx reducing means for the diesel engine, since it contains extra oxygen, so that retardation of fuel injection timing (timing retardation) and water jet are being investigated. However, the former entails lowering of outputs or worsening of fuel efficiency, inevitably causing increase of CO and HC. The latter involves problems of installation of a water jet system and water tank, inclusion of water in lubricating oil, etc. Therefore, an exhaust gas recirculation (EGR) system, in which exhaust gas, an inert material, is recirculated as an EGR gas to a combustion chamber, is being put to practical use, since it has a relatively simple construction and is less susceptible to the aforesaid harmful influences.

In an EGR system for a diesel engine, if the recirculation quantity (hereinafter referred to as EGR quantity) of the EGR gas becomes excessive, the delivery of smoke or HC suddenly increases as the excess air rate lowers, and the fuel efficiency deteriorates. Besides, engine oil is deteriorated by inclusion of free carbon or particulates, so that lowering of the engine durability or the like occurs. In order to reduce NOx while minimizing these troubles, therefore, it is advisable to use an electronic control device for detecting the excess air rate to effect feedback control of the EGR quantity or to keep the excess air rate within an appropriate range even during transient operation or the like, to say nothing of steady-state operation.

In general, methods for detecting the excess air rate include a method using a $CO_2$ analyzer and a method using a linear air-fuel ratio sensor (hereinafter referred to as LAFS).

As is generally known, however, the $CO_2$ analyzer is large-sized and heavy in weight, so that it is not practical for vehicular use, although it can be used for a bench test or the like. As known EGR apparatuses equipped with the LAFS, on the other hand, there are ones described in Jpn. Pat. Appln. KOKAI Publication Nos. 55-7964 and 63-201356. In the former EGR apparatus, the LAFS is attached to an exhaust system, and an EGR valve is actuated in its opening direction when the output current of the LAFS is higher than a given threshold value, and in contrast with this, in its closing direction when the output current is lower. In the latter EGR apparatus, an EGR valve is actuated with reference to a control map for the EGR quantity, while the EGR valve opening degree (control map) is corrected by means of the LAFS that is attached to an exhaust system, which control map is determined as a function of the lever opening degree (accelerator opening degree) of a fuel injection pump and the engine rotation speed.

Nevertheless, those EGR apparatuses equipped with the LAFS for the feedback control of the EGR quantity have the following problems.

Since the LAFS is attached to the exhaust system, for example, a delay in transfer is caused before the exhaust gas reaches the LAFS even though the excess air rate actually changes. Since the LAFS is designed so as to output a current corresponding to the excess air rate, based on the principle of an oxygen concentration cell, and that the exhaust gas reaches the elements through a protective tube, moreover, the response to change of the excess air rate is low itself. At the time of acceleration or deceleration such that the excess air rate suddenly changes, therefore, a delay (normally tens of strokes) is caused before the LAFS detects the change of the excess air rate, as shown in FIG. 1. FIG. 1 shows changes of the excess air rate with time caused when the injection quantity is suddenly increased, the full and tow dot chain lines representing an actual excess air rate change and an excess air rate change detected by the LAFS, respectively. Naturally, therefore, the control of the EGR apparatus is subject to a delay, so that the delivery of NOx or black smoke increases inevitably, posing a problem. In particular, immediately after acceleration, when black smoke is originally liable to be discharged, the delivery of black smoke is further increased by the excessive EGR quantity.

In the case of a diesel engine, moreover, the exhaust gas contains free carbon or particulates in abundance, so that the LAFS is soiled in a short period of time and ceases to output the current corresponding to the excess air rate. Accordingly, the accuracy of detection gradually deteriorates, so that the EGR quantity cannot be controlled accurately. Since the LAFS itself is an expensive component, moreover, the initial cost is naturally high, and besides, routine inspections, replacement, etc. entail a high running cost.

On the other hand, many diesel engines are furnished with a turbo charger, in order to increase the output per stroke volume. The turbo charger, which serves for supercharge utilizing exhaust gas energy (exhaust pressure), comprises a turbine attached to an exhaust manifold or the like and a compressor coaxial therewith and arranged in a suction system. As is generally known, the work load or supercharge pressure of the turbo charger depends on the exhaust pressure, and becomes lower in a low-load low-speed engine operation mode and higher in a high-load high-speed engine operation mode. Also, the turbo charger is subject to a natural response delay (turbo lag), since it takes some time for the exhaust pressure to increase, due to a delay in transfer or the like, even though the quantity of fuel supply is increased by a driver's accelerator operation, and the inertias of the turbine and the compressor prevent an immediate triggering of their rotation.

In the case where the EGR apparatus is attached to a turbo-charged diesel engine, accelerative operation involves the following problems.

In the case of a diesel engine without a throttle valve, the quantity of fuel injection into the combustion chamber is increased according to the driver's stepping on the accelerator pedal, whereupon the operation mode changes from steady-state over to acceleration. Unlike a gasoline engine of the manifold-injection type or the like, to which an air-fuel mixture of a predetermined air-fuel ratio is supplied, this engine is designed so that the injection quantity increases irrespective of the quantity of intake air, whereby the torque generated increases to effect acceleration. Accordingly, the rate of excess air in the combustion chamber is set according to the intake air quantity and the fuel injection quantity, and substantially varies during the acceleration. Thus, the excess air rate is instantaneously lowered as the injection quantity increases in a very early stage of the acceleration. If the supercharge pressure provided by the turbo charger rises as the exhaust pressure increases, however, the excess air rate is suddenly enhanced with the increase of the intake. In consideration of the entire period of the acceleration, therefore, the increase of harmful exhaust components can be restricted to a negligible degree.

In the turbo-charged engine equipped with the EGR apparatus, however, the EGR gas is fetched from the exhaust system on the upstream side of the turbine. When the EGR apparatus is actuated (EGR gas is recirculated), therefore, a nonnegligible portion of the increased exhaust pressure inevitably runs out into the suction system without driving the turbine. As a result, the increasing rate of the supercharge pressure is lowered, and the harmful exhaust components are increased on account of lowering of the excess air rate. If the fuel injection quantity is restricted unconditionally in order to prevent the excess air rate from lowering, accelerating force is reduced, so that the drivability deteriorates.

DISCLOSURE OF THE INVENTION

An object of the present invention is to provide an excess air rate detecting apparatus, for rapidly detecting the excess air rate of a diesel engine or the like despite the use of a simple, low-cost apparatus arrangement, and an excess air rate control apparatus based on the principle thereof.

Another object of the present invention is to provide an excess air rate control apparatus, which can reconcile the maintenance of accelerating force and reduction of harmful exhaust gas components despite the use of a simple, low-cost apparatus arrangement, and which is suited for use with an engine furnished with a turbo charger.

According to the present invention, there is provided an excess air rate detecting apparatus for an engine which is mounted in a vehicle and which includes a suction passage and an exhaust gas recirculation system for recirculating part of exhaust gas into the suction passage. In accordance with operating conditions of the engine, the excess air rate detecting apparatus repeatedly detects the excess air rate of that air-fuel mixture which is supplied to the engine while the exhaust gas recirculation system is operating.

The excess air rate detecting apparatus according to the present invention comprises: intake pressure detecting means for detecting the intake pressure of the engine; exhaust gas recirculation quantity estimating means for estimating the quantity of recirculation of the exhaust gas by the exhaust gas recirculation system in accordance with at least the intake pressure detected by the intake pressure detecting means; equivalent intake air quantity estimating means for estimating an equivalent intake air quantity of the engine; fuel supply quantity detecting means for detecting the quantity of fuel supply to the engine; excess air rate estimating means for estimating the excess air rate for the engine in accordance with the fuel supply quantity set by the fuel supply quantity setting means and the equivalent intake air quantity estimated by the equivalent intake air quantity estimating means; and storage means for storing the excess air rate estimated by the excess air rate estimating means. The equivalent intake air quantity estimating means estimates, preferably with every stroke, the quantity of recirculation of the exhaust gas in accordance with at least the exhaust gas recirculation quantity, which was estimated by the exhaust gas recirculation quantity estimating means, and the excess air rate, which was estimated during the last cycle but a predetermined number of cycles and stored in the storage means.

According to the excess air rate detecting apparatus arranged in this manner, the excess air rate for a diesel engine or the like can be detected accurately and rapidly without using an LAFS or the like, which is poor in reliability and entails high cost. With use of this detecting apparatus, the injection quantity and EGR quantity can be appropriately controlled in order to reduce the delivery of NOX or black smoke.

Preferably, the apparatus further comprises exhaust pressure detecting means for detecting the exhaust pressure of the engine, and the exhaust gas recirculation quantity estimating means estimates the quantity of recirculation of the exhaust gas in accordance with the intake pressure detected by the intake pressure detecting means and the exhaust pressure detected by the exhaust pressure detecting means.

Preferably, moreover, the apparatus comprises valve opening degree detecting means for detecting the valve opening degree of the exhaust gas recirculation system, and the exhaust gas recirculation quantity estimating means estimates the quantity of recirculation of the exhaust gas further in accordance with the valve opening degree detected by the valve opening degree detecting means.

Further preferably, the apparatus comprises engine rotation speed detecting means for detecting the rotation speed of the engine, and the exhaust gas recirculation quantity estimating means obtains an orifice factor in accordance with the difference between the detected exhaust pressure and the detected intake pressure, obtains a recirculated exhaust gas temperature coefficient in accordance with the detected engine rotation speed and the detected fuel supply quantity, and estimates the quantity of recirculation of the exhaust gas in accordance with the detected valve opening degree, the obtained orifice factor, and the obtained recirculated exhaust gas temperature coefficient.

Thus, the apparatus according to the present invention need not be provided with a flow sensor or the like for recirculated exhaust gas, so that its costs and the number of its components can be restrained from increasing.

A preferred mode of the present invention is applied to an engine which is provided with a turbo charger for supercharging the engine with intake by driving a turbine by means of the exhaust gas, and the exhaust pressure detecting means detects the exhaust pressure on the upstream side of the turbine. According to this mode, the apparatus need not be provided with a flow sensor or the like for detecting the quantity of recirculation of the exhaust gas, so that its costs and the number of its components can be restrained from increasing.

Preferably, the apparatus comprises engine rotation speed detecting means for detecting the rotation speed of the engine and total intake quantity detecting means for computing a total intake quantity, including the quantity of the exhaust gas recirculated by the exhaust gas recirculation system, in accordance with the detected intake pressure. The storage means stores the exhaust gas recirculation quantity estimated by the exhaust gas recirculation quantity estimating means, the total intake quantity computed by the total intake quantity detecting means. The exhaust pressure detected by the exhaust pressure detecting means, and the exhaust pressure detecting means obtains a steady-state value of the exhaust pressure on the upstream side of the turbine in accordance with the detected engine rotation speed and the detected fuel supply quantity, obtains a turbine acceleration pressure in accordance with the obtained steady-state exhaust pressure value, the exhaust gas recirculation quantity and total intake quantity, which quantities were individually stored in the storage means for the last cycle but a predetermined number of cycles, obtains a turbine load from the obtained turbine acceleration pressure and the obtained steady-state exhaust pressure value, and obtains the present value of the exhaust pressure in accordance with the preceding value of the exhaust pressure stored in the storage means, the obtained turbine acceleration pressure, and the obtained turbine load. This preferred apparatus of the invention need not be provided with an exhaust pressure sensor, so that its costs and the number of its components can be restrained from increasing.

Another preferred apparatus according the present invention comprises total intake quantity detecting means for computing a total intake quantity, including the quantity of the exhaust gas recirculated by the exhaust gas recirculation system, in accordance with the detected intake pressure, and the equivalent intake air quantity estimating means estimates the equivalent intake air quantity accurately and in a real-time fashion, in accordance with the computed total intake quantity, the excess air rate, which was estimated during the last cycle but the predetermined number of cycles and stored in the storage means, and the estimated exhaust gas recirculation quantity.

Preferably, the equivalent intake air quantity estimating means divides the estimated exhaust gas recirculation quantity by the excess air rate, which was estimated the predetermined number of cycles in advance of current cycle, to obtain the quantity of consumed air, which is not contributory to combustion, out of the exhaust gas recirculated in the exhaust gas recirculation system, and subtracts the obtained consumed air quantity from the computed total intake quantity, to estimate the equivalent intake air quantity, thus estimating the equivalent intake air quantity accurately and in a real-time fashion.

An apparatus according to still another preferred mode of the present invention comprises an airflow sensor, which is provided on the upstream side of the position where the exhaust gas is supplied into the suction passage by the exhaust gas recirculation system and used to detect the quantity of an intake air flowing in the suction passage, and the exhaust gas recirculation quantity estimating means estimates the exhaust gas recirculation quantity in accordance with the intake pressure detected by the intake pressure detecting means and the intake air quantity detected by the airflow sensor.

Preferably, the apparatus comprises in-cylinder intake air quantity estimating means for estimating the quantity of the intake air actually sucked into a cylinder in accordance with the intake air quantity detected by the airflow sensor and a delay in transportation time, and the exhaust gas recirculation quantity estimating means estimates the exhaust gas recirculation quantity in accordance with an actual in-cylinder intake air quantity estimated by the in-cylinder intake air quantity estimating means.

Further preferably, the in-cylinder intake air quantity estimated by the in-cylinder intake air quantity estimating means is stored in the storage means, and the in-cylinder intake air quantity estimating means estimates the actual in-cylinder intake air quantity in accordance with the preceding value of the in-cylinder intake air quantity stored in the storage means and the present value of the intake air quantity detected by the airflow sensor.

An apparatus according to another preferred mode of the present invention comprises total intake quantity detecting means for computing a total intake quantity, including the quantity of the exhaust gas recirculated by the exhaust gas recirculation system, in accordance with the intake pressure detected by the intake pressure detecting means, and the exhaust gas recirculation quantity estimating means estimates the exhaust gas recirculation quantity by subtracting the intake air quantity detected by the airflow sensor from the intake quantity computed by the total intake quantity detecting means, thus accurately estimating the exhaust gas recirculation quantity for transient operation or the like without regard to the valve opening degree or the like of the exhaust gas recirculation system.

In an apparatus according to another preferred mode of the present invention, moreover, the equivalent intake air quantity estimating means estimates the equivalent intake air quantity in accordance with the intake air quantity detected by the airflow sensor, the excess air rate, which was estimated during the last cycle but the predetermined number of cycles and stored in the storage means, and the exhaust gas recirculation quantity estimated by the exhaust gas recirculation quantity estimating means. Thus, the excess air rate for a diesel engine or the like can be detected accurately and rapidly without using an LAFS or the like, which is poor in reliability and entails high cost, and the fuel injection quantity and EGR quantity can be appropriately controlled in order to reduce the delivery of NOx or black smoke.

In apparatus according to still another preferred mode of the present invention, the equivalent intake air quantity estimating means computes a residual air quantity in accordance with the excess air rate, which was estimated during the last cycle but the predetermined number of cycles and stored in the storage means, and the exhaust gas recirculation quantity estimated by the exhaust gas recirculation quantity estimating means, and estimates the equivalent intake air quantity by adding the computed residual air quantity to the actual in-cylinder intake air quantity estimated by the in-cylinder intake air quantity estimating means, thereby accurately detecting the excess air rate.

An excess air rate control apparatus according to another mode of the present invention comprises excess air rate estimating means for estimating the excess air rate of an air-fuel mixture supplied to an engine; target excess air rate setting means for setting a target excess air rate of the air-fuel mixture supplied to the engine; valve opening degree setting means for setting a target valve opening degree for an exhaust gas recirculation system such as to remove a deviation between the excess air rate estimated by the excess air rate estimating means and the target excess air rate set by the target excess air rate setting means; and an operation control device for controlling the operation of the exhaust gas recirculation system in accordance with the target valve opening degree set by the valve opening degree setting means. The valve opening degree setting means sets the target valve opening degree at least by proportional-plus-integral control such that an integral term for the proportional-plus-integral control is not integrated when the absolute value of a deviation between the estimated excess air rate and the set target excess air rate is larger than a predetermined value. Thus, while deterioration of control response, which may be caused by an unreasonable integral term, is prevented, the delivery of NOx or black smoke are reduced.

Preferably, the apparatus comprises fuel supply quantity detecting means for detecting the quantity of fuel supply to the engine and engine rotation speed detecting means for detecting the rotation speed of the engine, and the target excess air rate setting means sets the target excess air rate in accordance with the engine rotation speed detected by the engine rotation speed detecting means and the fuel supply quantity set by the fuel supply quantity setting means, thereby permitting a reduction in the delivery of NOx or black smoke even during transient operation or the like.

According to still another mode of the present invention, there is provided an excess air rate control apparatus for controlling, in accordance with operating conditions of the engine, the excess air rate of an air-fuel mixture supplied to an engine while an exhaust gas recirculation system is operating, which engine includes a turbo charger for supercharging intake by driving a turbine by means of exhaust gas of the engine and the exhaust gas recirculation system for recirculating part of the exhaust gas, taken out of the exhaust passage on the upstream side of the turbo charger, into a suction passage.

This control apparatus of the invention comprises: intake pressure detecting means for detecting the intake pressure of the engine; exhaust pressure detecting means for detecting the exhaust pressure of the engine; exhaust gas recirculation quantity estimating means for estimating the quantity of recirculation of the exhaust gas by the exhaust gas recirculation system in accordance with the intake pressure detected by the intake pressure detecting means and the exhaust pressure detected by the exhaust pressure detecting means; total intake quantity detecting means for detecting a total intake quantity of the engine, including the quantity of the exhaust gas recirculated by the exhaust gas recirculation system; equivalent intake air quantity estimating means for estimating an equivalent intake air quantity of the engine; fuel supply quantity setting means for setting the quantity of fuel supply to the engine in accordance with a depression amount of an accelerator pedal of a vehicle; fuel supply means for supplying a fuel to the engine in accordance with the fuel supply quantity set by the fuel supply quantity setting means; excess air rate estimating means for estimating the excess air rate for the engine in accordance with the fuel supply quantity set by the fuel supply quantity setting means and the equivalent intake air quantity estimated by the equivalent intake air quantity estimating means; storage means for storing the excess air rate estimated by the excess air rate estimating means; target excess air rate setting means for setting a target excess air rate of the air-fuel mixture supplied to the engine; valve opening degree setting means for setting a target valve opening degree of the exhaust gas recirculation system in accordance with the excess air rate estimated by the excess air rate estimating means and the target excess air rate set by the target excess air rate setting means; and operation control means for controlling the operation of the exhaust gas recirculation system in accordance with the target valve opening degree set by the valve opening degree setting means. The equivalent intake air quantity estimating means estimates the equivalent intake air quantity in accordance with the detected total intake quantity, the excess air rate estimated for the last cycle but a predetermined number of cycles, and the estimated exhaust gas recirculation quantity.

Preferably, the valve opening degree setting means sets the target valve opening degree such as to remove a deviation between the excess air rate estimated by the excess air rate estimating means and the target excess air rate set by the target excess air rate setting means.

Preferably, moreover, the apparatus comprises engine rotation speed detecting means for detecting the rotation speed of the engine, and the target excess air rate setting means sets the target excess air rate in accordance with the detected engine rotation speed and the set fuel supply quantity, thereby compensating for a delay in operation of the exhaust gas recirculation system at the time of acceleration or the like.

An apparatus according to a further preferred mode of the present invention comprises decision means for determining whether or not the excess air rate estimated by the excess air rate estimating means is within a predetermined allowable range, and the operation control means actuates the exhaust gas recirculation system in the closing direction, thereby restraining a delay in operation of the turbo charger attributable to an outflow of the exhaust pressure into a suction system, when the decision means concludes that the estimated excess air rate is out of the allowable range. The fuel supply means includes restraining means for restraining an increase of the fuel supply quantity without regard to the depression amount of the accelerator pedal, so that the lowering of the excess air rate can be prevented despite a delay in closure of the exhaust gas recirculation system.

Preferably, the restraining means should be arranged so as to hold the fuel supply quantity at a preceding value stored in the storage means. With this arrangement, necessary processing for restraining the fuel supply quantity can be simplified. In order to prevent acceleration response from deteriorating unduly, moreover, the restraining means should preferably be arranged so as to release the fuel supply quantity from the restraint after the passage of a predetermined period since the start of the actuation of the exhaust gas recirculation system in the closing direction. Alternatively, the restraining means may be designed so as to release the fuel supply quantity from the restraint when the decision means concludes that the estimated excess air rate is restored to the allowable range.

According to the excess air rate control apparatus in this mode of the present invention, there is no delay in operation of the turbo charger that is attributable to an outflow of the exhaust pressure into the suction system, and the excess air rate cannot be easily lowered even though the fuel supply quantity is increased at the time of acceleration or the like. In consequence, harmful exhaust gas components can be reduced while minimizing the lowering of accelerating force.

An excess air rate control apparatus according to still another mode of the present invention comprises fuel supply quantity correcting means for correcting the fuel supply quantity set by the fuel supply quantity setting means, in accordance with the result of comparison between the excess air rate estimated by the excess air rate estimating means and a predetermined excess air rate, and the fuel supply means supplies the fuel to the engine in accordance with the fuel supply quantity corrected by the fuel supply quantity correcting means.

Preferably, the fuel supply quantity correcting means corrects the fuel supply quantity set by the fuel supply quantity setting means so that the excess air rate estimated by the excess air rate estimating means approaches the predetermined excess air rate, thereby restraining an increase of harmful exhaust gas components attributable to the lowering of the excess air rate.

Preferably, moreover, the fuel supply quantity correcting means reduces the fuel supply quantity set by the fuel supply quantity setting means when the excess air rate estimated by the excess air rate estimating means is not higher than the predetermined excess air rate, thereby restraining an increase of harmful exhaust gas components attributable to the lowering of the excess air rate.

Preferably, moreover, the fuel supply quantity correcting means corrects the fuel supply quantity in accordance with a value obtained by multiplying the fuel supply quantity, which was set by the fuel supply quantity setting means, by the estimated excess air rate, and then dividing the obtained product by the predetermined excess air rate, when the excess air rate estimated by the excess air rate estimating means is not higher than the predetermined excess air rate, thereby effecting threshold control of the fuel supply quantity while restraining the discharge of harmful exhaust gas components.

The apparatus according to this mode of the present invention can minimize the lowering of accelerating force while preventing the discharge of harmful exhaust gas components.

The excess air rate detecting apparatus and the excess air rate control apparatus according to the present invention are applicable to an engine, e.g., a diesel engine, in which the fuel is injected directly into a combustion chamber.

BRIEF DESCRIPTION OF THE DRAWINGS

FIG. 12 is part of a flowchart showing a control procedure for an excess air rate control subroutine according to still another mode of the present invention.

BEST MODE OF CARRYING OUT THE INVENTION

A first embodiment of an excess air rate detecting apparatus and an exhaust-gas recirculation control apparatus according to the present invention will now be described in detail with reference to the drawings.

Figure 1:
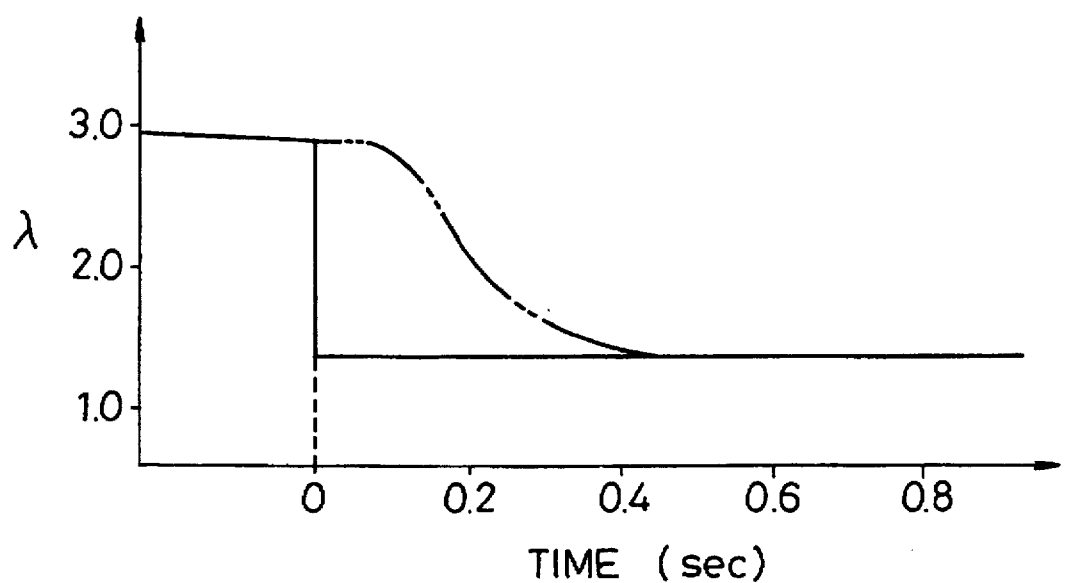
FIG. 1 shows graphs individually representing an actual excess air rate change (full line) caused when the injection quantity is suddenly increased and an excess air rate change (two-dot chain line) detected by a conventional apparatus.
Figure 2:
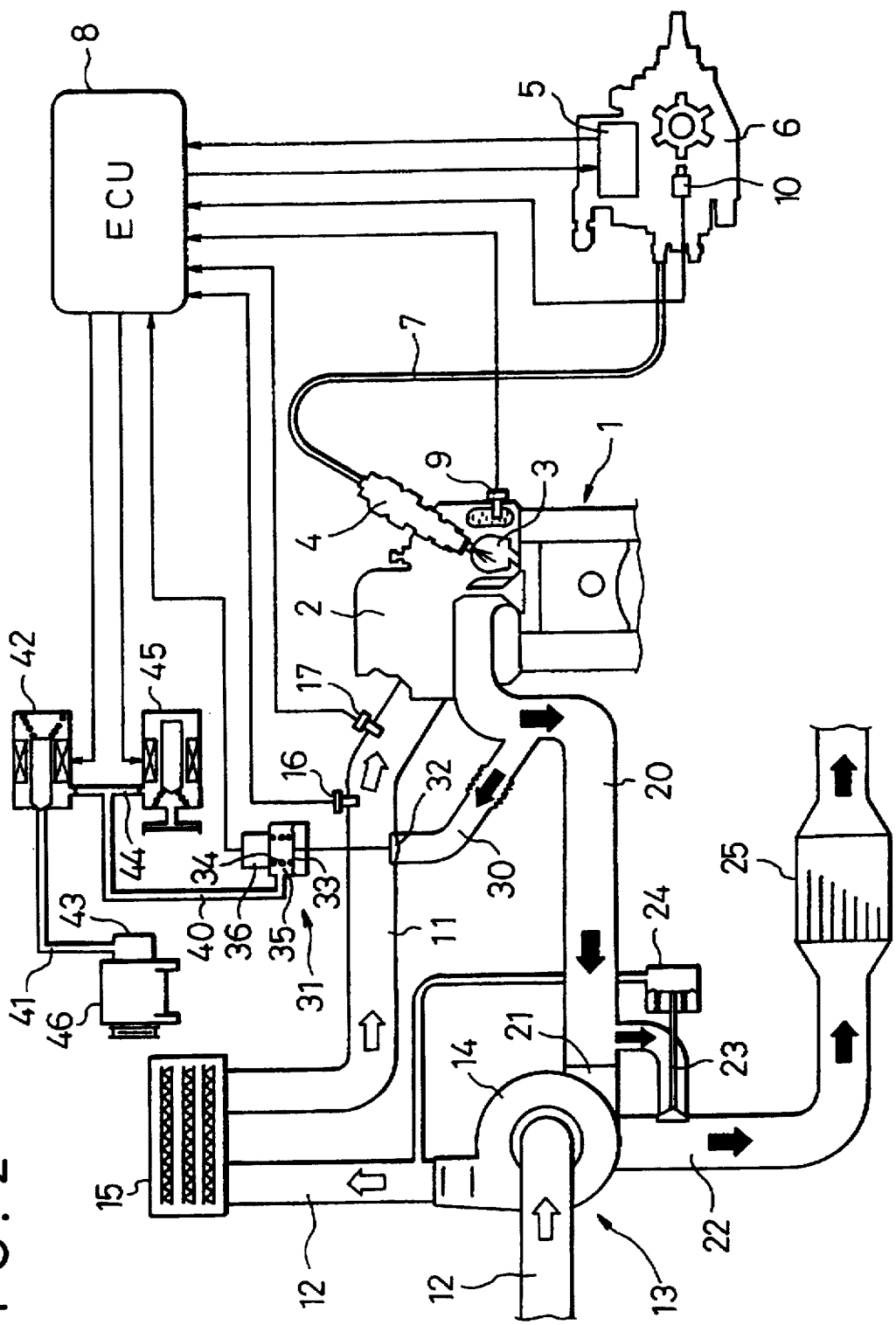
FIG. 2 is a schematic view of an engine control system according to one embodiment of the present invention.

FIG. 2 is a schematic view of an engine control system to which an EGR apparatus is attached. In this drawing, numeral 1 denotes an in-line four-cylinder diesel engine (hereinafter referred to simply as engine) for an automobile. A cylinder head 2 of the engine 1 is formed with a vortex flow chamber 3, which is fitted with fuel injection nozzles for injecting a fuel for individual cylinders. A distributor-type fuel injection pump 6 having an electronic governor 5 is attached to the engine 1, and supplies the fuel to each fuel injection nozzle 4 through a fuel injection pipe 7. The fuel injection pump 6 is actuated by means of a crankshaft (not shown) of the engine 1, and the fuel injection timing and fuel injection period are set by means of the electronic governor 5 that is controlled by an ECU (engine control unit) 8. In the drawing, numeral 9 denotes a water temperature sensor that is attached to the cylinder head 2 and used to detect a cooling water temperature Tw, and 10 denotes an Ne sensor attached to the fuel injection pump 6 and used to detect an engine rotation speed Ne.

The cylinder head 2 is connected with a suction pipe 12 for introducing a intake air from an air cleaner (not shown) through an intake manifold 11, and a compressor 14 of a turbo charger 13 and an intercooler 15 are arranged successively from the upper-course side in the middle of the suction pipe 12. The intake manifold 11 is fitted with an intake-air temperature sensor 16 for detecting an intake-air temperature Ta and a boost pressure sensor 17 for detecting a manifold absolute pressure (boost pressure) Pb. Further, the cylinder head 2 is connected with a turbine 21 of the turbo charger 13 and an exhaust pipe 22 through an exhaust manifold 20. The upper- and lower-course sides of the turbine 21 are connected by means of a waste gate valve 23, which allows exhaust gas to escape from the exhaust manifold 20 to the lower-course side of the turbine 21 when the supercharge pressure is increased excessively. The waste gate valve 23 is opened and closed by means of a waste gate actuator 24 that operates in response to the pressure on the lower-course side of the turbine 21. Also, the exhaust pipe 22 is provided with an oxidation catalyst 25 for clearing the exhaust gas of CO and HC.

On the other hand, the exhaust manifold 20 and the intake manifold 11 of the engine 1 communicate with each other by means of an EGR pipe 30. The line of the EGR pipe 30 is opened and closed by means of a valve body 32 of an EGR valve 31 provided on the side of the intake manifold 11. The EGR valve 31, which is of a negative-pressure-operated type, is composed of the valve body 32, a diaphragm 33, a return spring 34, and a negative-pressure chamber 35. The valve body 32 is fitted with an EGR position sensor 36 for detecting the opening degree $A_E$ of the EGR valve 31.

The negative-pressure chamber 35 of the EGR valve 31 is connected to a vacuum pump 43 by means of hoses 40 and 41, and opens into the atmosphere through hoses 40 and 44 and an atmosphere-side EGR solenoid 45. The vacuum pump 43 is actuated by means of the rotating shaft of an alternator 46, and continually generates a negative pressure during the operation of the engine 1. A negative-pressure-side EGR solenoid 42 is disposed in the middle of the hose 41. The negative-pressure-side EGR solenoid 42 opens the hose 41 when it is on, and closes the hose 41 when it is off. The atmosphere-side EGR solenoid 45 allows the hose 44 to open into the atmosphere when it is off, and cuts off the hose 44 from the atmosphere when it is on. Thus, a negative pressure or the atmosphere is introduced into the negative-pressure chamber 35 of the EGR valve 31 to control the opening degree $A_E$ of the EGR valve 31 by turning the two EGR solenoids 42 and 45 on or off as required.

The aforesaid ECU 8, which is set in the cabin of the automobile, comprises an input/output device (not shown), memories (ROM, RAM, etc.) stored with control programs, a central processing unit (CPU), etc. Detected informations from various sensors and switches, including the aforesaid individual sensors, are applied to the input side of the ECU 8. Based on these detected informations and control maps, the ECU 8 controls the operation of both the EGR solenoids 42 and 45 and the like, as well as the electronic governor 5.

The following is a description of an excess air rate detection procedure and a control procedure for the EGR apparatus according to the present embodiment.

Figure 3:
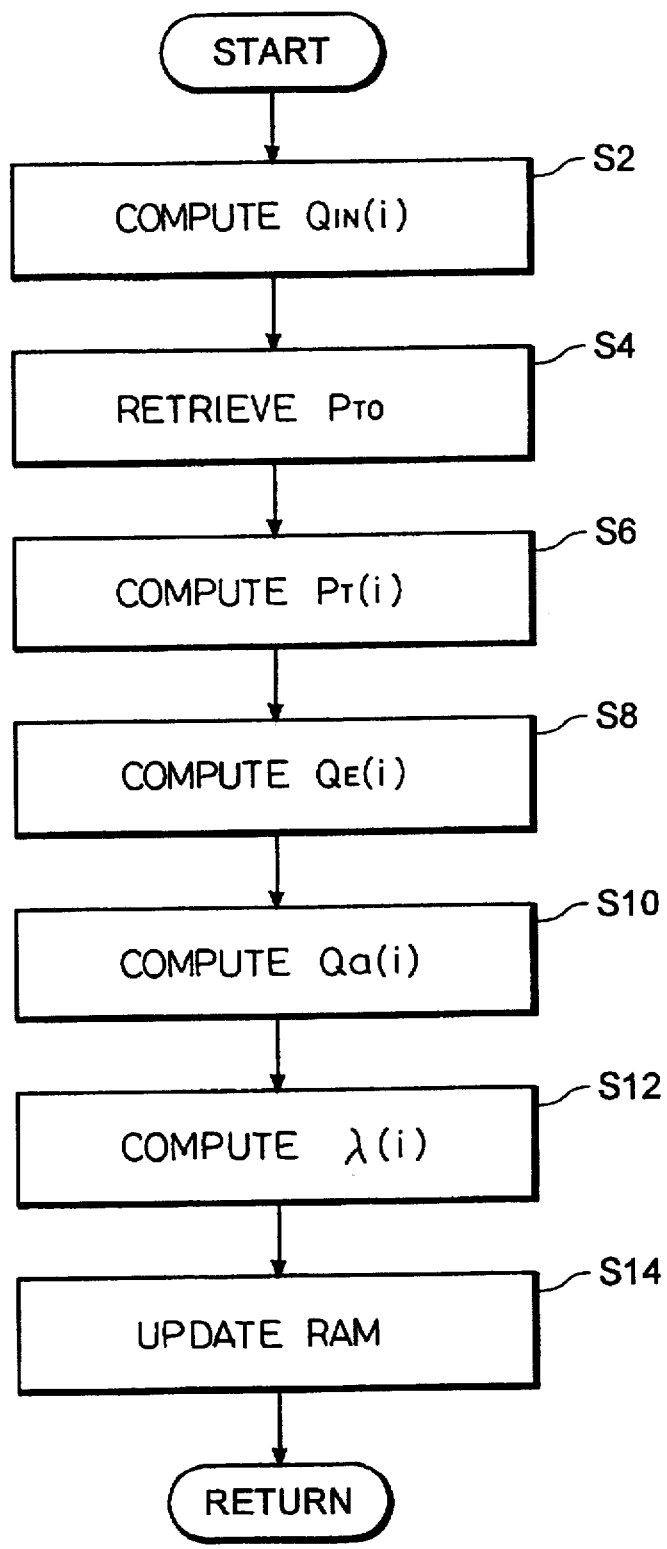
FIG. 3 is a flowchart showing a detection procedure for an excess air rate detection subroutine according to the present invention.

If predetermined conditions, e.g., the water temperature Tw of 70° C. or more, passage of 30 seconds or more since the start of the engine, normalcy of the boost pressure sensor 17 and the EGR position sensor 36, etc., are met after a driver turns on an ignition key (not shown) to start the engine 1, the ECU 8 repeatedly executes an excess air rate detection subroutine shown in the flowchart of FIG. 3 with every stroke of the engine 1. When this subroutine is started, the ECU 8 first computes, in Step S2, a present total intake quantity $Q_{IN}(i)$ (g/st) of the engine 1 for each stroke (st: sometimes described as stroke) in accordance with the respective outputs of the intake-air temperature sensor 16, boost pressure sensor 17, etc., according to the following equation (M1).

In the following equation (M1), Pb is a boost pressure (mmHg), V is a piston displacement (liter) for each cylinder, $K_{VE}$ is a volumetric efficiency correction factor obtained from a map (not shown) in accordance with the engine rotation speed Ne (rpm) and the boost pressure Pb, and Ta is the intake-air temperature (°C.). Further, "*" is a symbol for multiplication.

$$Q_{IN}(i)=(Pb/760)*V*K_{VE}*1.2*\{293/(273+Ta)\}. \quad (M1)$$

Then, the ECU 8 retrieves a steady-state upstream-side turbine pressure value $P_{To}$ from a map (not shown) in accordance with the engine rotation speed Ne and an fuel injection quantity Qf in Step S4, and computes a present upstream-side turbine pressure $P_T(i)$ (i.e., the pressure on the upstream side of the turbine) according to the following procedure in Step S6.

In computing the upstream-side turbine pressure $P_T(i)$, the ECU 8 first computes a turbine accelerating pressure $P_A$ according to the following equation (M2). In the following equation (M2), $Q_E(i-3)$ and $Q_{IN}(i-3)$ are an EGR quantity and a total intake quantity, respectively, for the last stoke but two.

$$P_A=P_{to}*(1-Q_E(i-3)/Q_{IN}(i-3)). \quad (M2)$$

Then, based on the turbine accelerating pressure $P_A$ and the steady-state upstream-side turbine pressure value $P_{To}$, the ECU 8 computes a load $P_L$ according to the following equation (M3).

$$P_L=P_A^2/P_{To}. \quad (M3)$$

Finally, the ECU 8, using a preceding value $P_T(i-1)$, the turbine accelerating pressure $P_A$, and the load $P_L$, computes the upstream-side turbine pressure $P_T(i)$ according to the following equation (M4). In the following equation (M4), It is a coefficient of turbine inertia.

$$P_T(i)=P_T(i-1)+(P_A-P_L). \quad (M4)$$

When the upstream-side turbine pressure $P_T(i)$ is obtained in this manner, the ECU 8 computes a present EGR quantity $Q_E(i)$ (g/stroke) according to the following equation (M5) in Step S8. In the following equation (M5), $A_E$ is the opening degree (%) of the EGR valve 31 detected by the EGR position sensor 36, Ks is a restriction factor (fixed value), Ko is an orifice factor retrieved from a map (not shown) in accordance with a differential pressure ΔP between the upstream-side turbine pressure $P_T(i)$ and the boost pressure Pb, and $K_{ET}$ is an EGR temperature coefficient retrieved from a map (not shown) in accordance with the engine rotation speed Ne and the injection quantity Qf.

$$Q_E(i)=A_E*Ks*Ko*K_{ET}*60/(2*Ne). \quad (M5)$$

Although the accuracy of computation of the EGR quantity is poor in the case of a diesel or gasoline engine of normal aspiration, which is not provided with a turbo charger, such as the one according to the present invention, the orifice factor Ko may be obtained as a function of the boost pressure Pb only. In the case where the EGR valve is an on-off valve, the aforesaid value $A_E$ is a constant (fixed value).

When the EGR quantity $Q_E(i)$ is obtained, the ECU 8 then computes an equivalent intake air quantity Qa(i), which is obtained by conversion of the total intake quantity $Q_{IN}(i)$ into an intake air, according to the following equation (M6) in Step S10.

$$Qa(i)=Q_{IN}(i)-Q_E(i)\lambda(i-3), \quad (M6)$$

where λ(i−3) is an estimated excess air rate for the last stroke but a predetermined number of strokes, e.g., two strokes, concerned in the intake air newly sucked into the engine 1 in the present cycle, and is set at a predetermined value (e.g., 1.2) until a second process (i.e., second stroke) since the start of the subroutine. The term ($Q_E(i)/\lambda(i-3)$) on the right side of equation (M6) indicates a quantity of air consumed in the last stroke of combustion but two and unconcerned in the present cycle of combustion. The equivalent intake air quantity Qa(i) can be estimated by subtracting the consumed air quantity from the computed total intake quantity.

Then, based on the equivalent intake air quantity Qa(i) thus obtained and the injection quantity Qf, the ECU 8 computes a present estimated excess air rate λ (i) in Step S12. Here 14.5 is the theoretical air-fuel ratio of the fuel used in the diesel engine.

$$\lambda(i)=Qa(i)/(Qf*14.5). \quad (M7)$$

Then, after updating estimated excess air rates λ(i), λ(i−1), λ(i−2), . . . stored in the RAM, the ECU 8 returns to START, whereupon it repeats the detection of the excess air rate.

If the detected estimated excess air rate λ(i) is not higher than a target excess air rate λ target, the ECU 8 actuates the EGR valve 31 in the closing direction to increase the equivalent intake air quantity Qa(i) in an EGR control subroutine (mentioned later), in order to restrain the emission of black smoke, and also actuates the electronic governor 5 to restrain the increase of the injection quantity Qf in a fuel injection control subroutine (not mentioned here).

Figure 4:
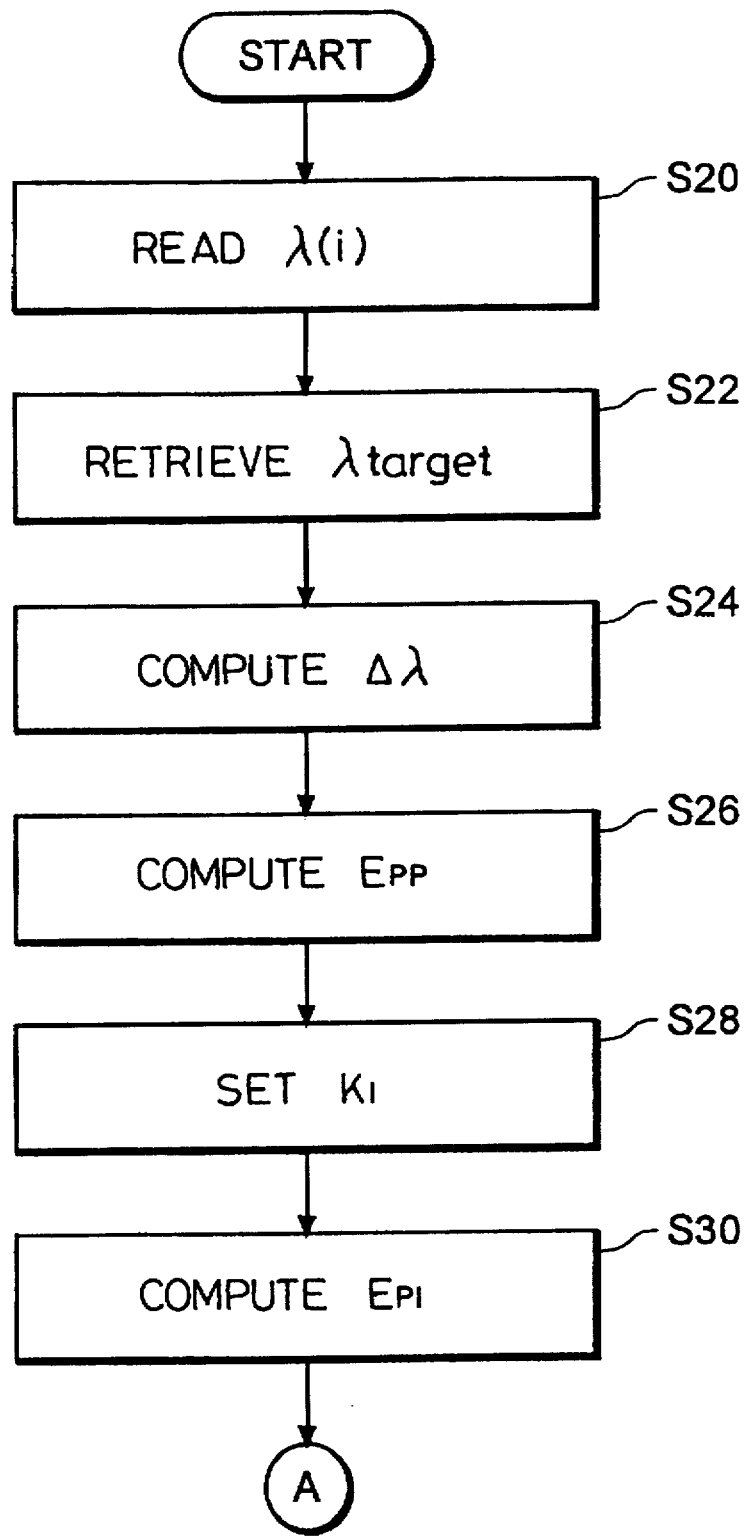
FIG. 4 is part of a flowchart showing a control procedure for an EGR control subroutine according to the present invention.
Figure 5:
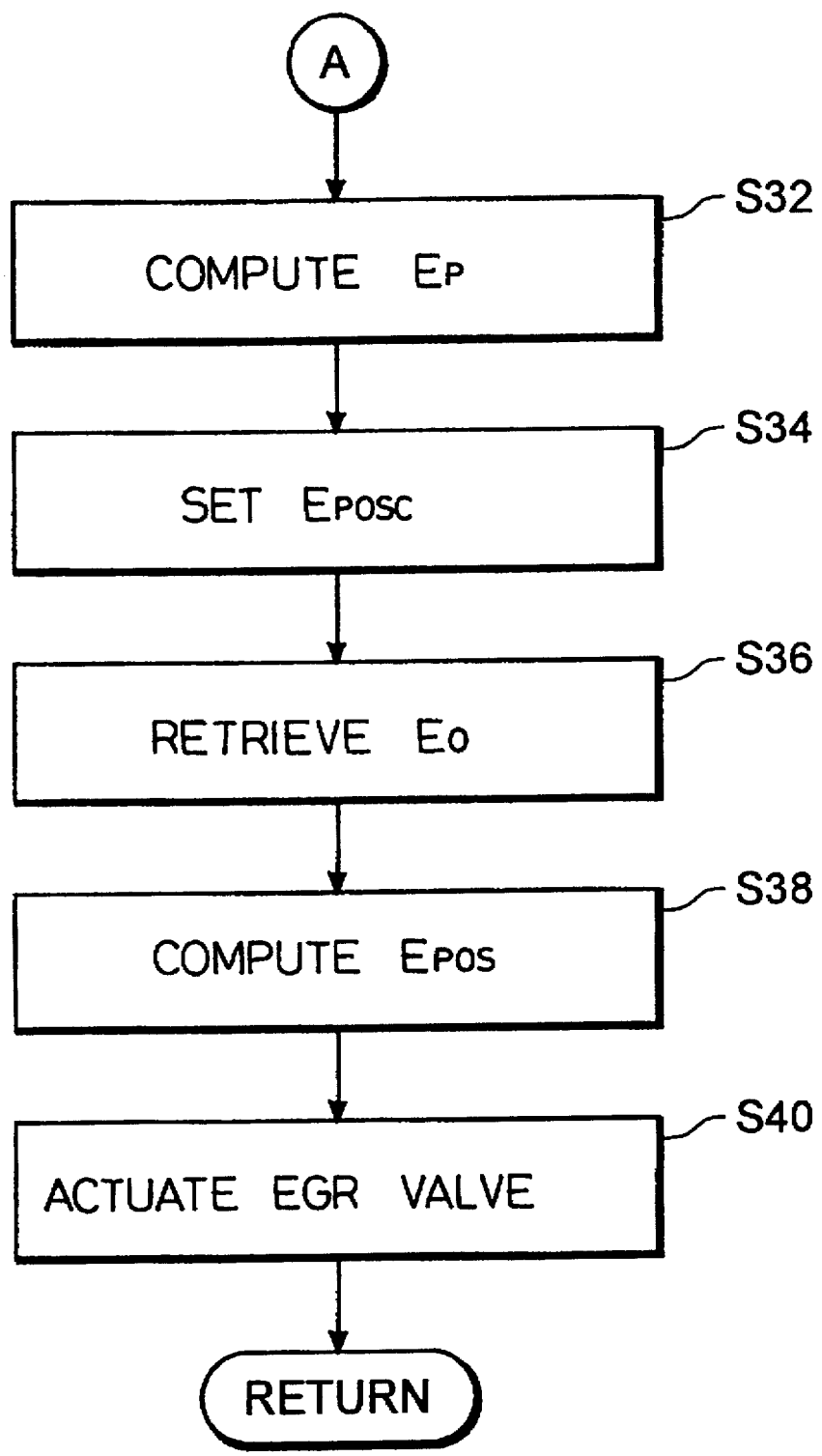
FIG. 5 is a remaining flowchart for the EGR control procedure, continued from the flowchart of FIG. 4.

On the other hand, the ECU 8 executes the EGR control subroutine shown in the flowcharts of FIGS. 4 and 5 in parallel with the excess air rate detection subroutine.

When this subroutine is started, the ECU 8 first reads the present estimated excess air rate λ(i), obtained in the excess air rate detection subroutine, from the RAM in Step S20. In Step S22, thereafter, the ECU 8 retrieves the target excess air rate λ target from a map (not shown) in accordance with the engine rotation speed Ne and the injection quantity Qf.

Then, the ECU 8 computes a deviation Δλ between the target excess air rate λ target and the estimated excess air rate λ(i) according to the following equation (N1) in Step S24.

$$\Delta\lambda=\lambda\text{target}-\lambda(i). \tag{N1}$$

After finishing the computation of the deviation $\Delta\lambda$, the ECU 8 computes a proportional term $E_{PP}$ for EGR control according to the following equation (N2) using a predetermined proportional gain $K_P$ in Step S26.

$$E_{PP}=K_P*\Delta\lambda. \tag{N2}$$

Then, in Step S28, the ECU 8 sets a proportional gain $K_I$ at a predetermined value if the deviation $\Delta\lambda$ is between an upper limit value $\lambda U$ and a lower limit value $\lambda L$, and at 0 if the deviation $\Delta\lambda$ is out of this range. In Step S30, thereafter, the ECU 8 computes an integral term $E_{PI}$ for EGR control according to the following equation (N3). If the deviation is larger than the upper limit value $\lambda U$ or smaller than the lower limit value $\lambda L$, the absolute value of the integral term $E_{PI}$ becomes so large that the control follow-up properties to cope with changes of operating conditions deteriorate.

$$E_{PI}=E_{PI}+K_I*\Delta\lambda. \tag{N3}$$

After finishing the computation of the proportional term $E_{PP}$ and the integral term $E_{PI}$, the ECU 8 computes a basic correction amount $E_P$ for the EGR valve opening degree according to the following equation (N4) in Step S32 of FIG. 5.

$$E_P=E_{PP}+E_{PI}. \tag{N4}$$

Then, in Step S34, the ECU 8 carries out a limiting process for clipping the computed basic correction amount $E_P$ at predetermined upper and lower limit values, and sets an opening degree correction amount Eposc for the EGR valve 31.

Then, the ECU 8 retrieves a basic opening degree Eo of the EGR valve 31 from a map in accordance with the engine rotation speed Ne and the injection quantity Qf in Step S36, and computes a target EGR valve opening degree Epos according to the following equation (N5) in Step S38.

$$Epos=Eo+Eposc. \tag{N5}$$

Then, after controlling the operation of the EGR valve 31 in accordance with the target EGR valve opening degree Epos in Step S40, the ECU 8 returns to START and repeats the control.

Thus, in the embodiment described above, the excess air rate is estimated from the intake pressure, fuel injection quantity, etc., so that the excess air rate can be detected accurately and rapidly without using any expensive sensors, such as an LAFS. By controlling the operation of the EGR valve 31 in accordance with the detected excess air rate, moreover, an EGR gas can be appropriately recirculated even at the time of acceleration or deceleration, so that the delivery of black smoke or NOx can be restrained to an extremely low level.

Although the present invention is applied to the diesel engine that is provided with the turbo charger, according to the foregoing embodiment, it may also be suitably applied to a normal-aspiration diesel or lean-burn gasoline engine. Although the upstream-side turbine pressure is computed on the basis of the turbine accelerating pressure, steady-state upstream-side turbine pressure value, etc. in the aforesaid excess air rate detection subroutine, it may be actually measured by using an exhaust pressure sensor or the like.

According to the embodiment described above, the excess air rate is estimated from the operation parameters (EGR quantity and total intake quantity) for the last stroke but two. Alternatively, however, a variable system may be employed such that operation parameters for the last stroke but one or three or more are used depending on the operating conditions. Although the excess air rate is estimated with every suction stroke according to the foregoing embodiment, furthermore, it may alternatively be estimated without synchronizing with the stroke.

The following is a description of a second embodiment of the present invention.

Figure 6:
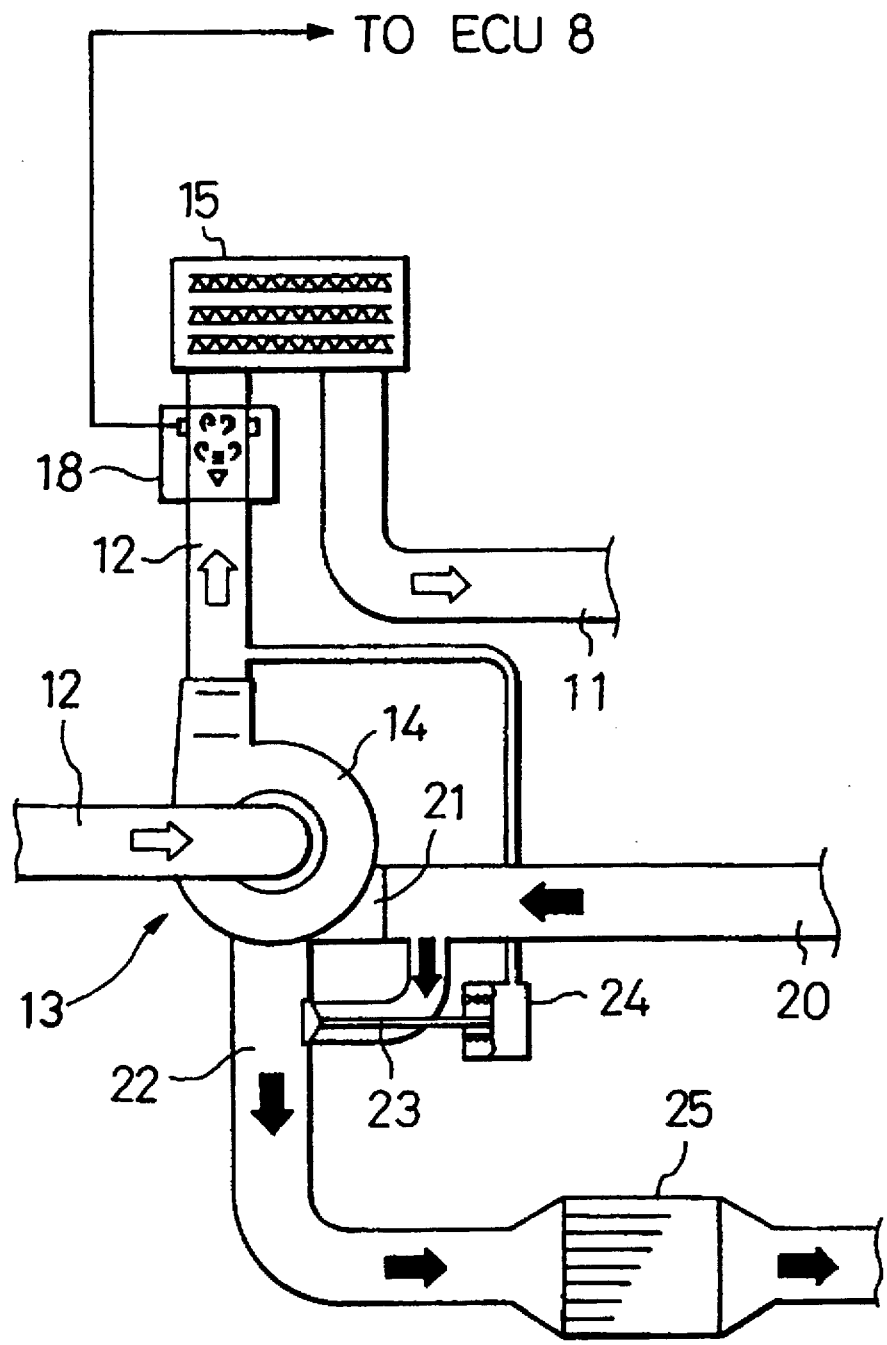
FIG. 6 is a view showing an outline of part of an engine control system according to another mode for carrying out the present invention.

In the second embodiment for carrying out the present invention, as shown in FIG. 6, an airflow sensor 18 is only added to the suction pipe 12 between the compressor 14 of the turbo charger 13 and the intercooler 15. The other portions are arranged in the same manner as those in the engine control system shown in FIG. 2. Although the airflow sensor 18 for detecting an intake air quantity Qaf is of a Karman-vortex type according to the embodiment, it may be of a hot-wire or vane type. Also, the airflow sensor 18 may be located in any other region in the suction system, provided that it is situated on the upstream side of an EGR gas inlet port of the intake manifold 11 to which the EGR pipe 30 is connected.

In this arrangement, the detection of the excess air rate and the control of the EGR apparatus according to the second embodiment are carried out in the following manner.

Figure 7:
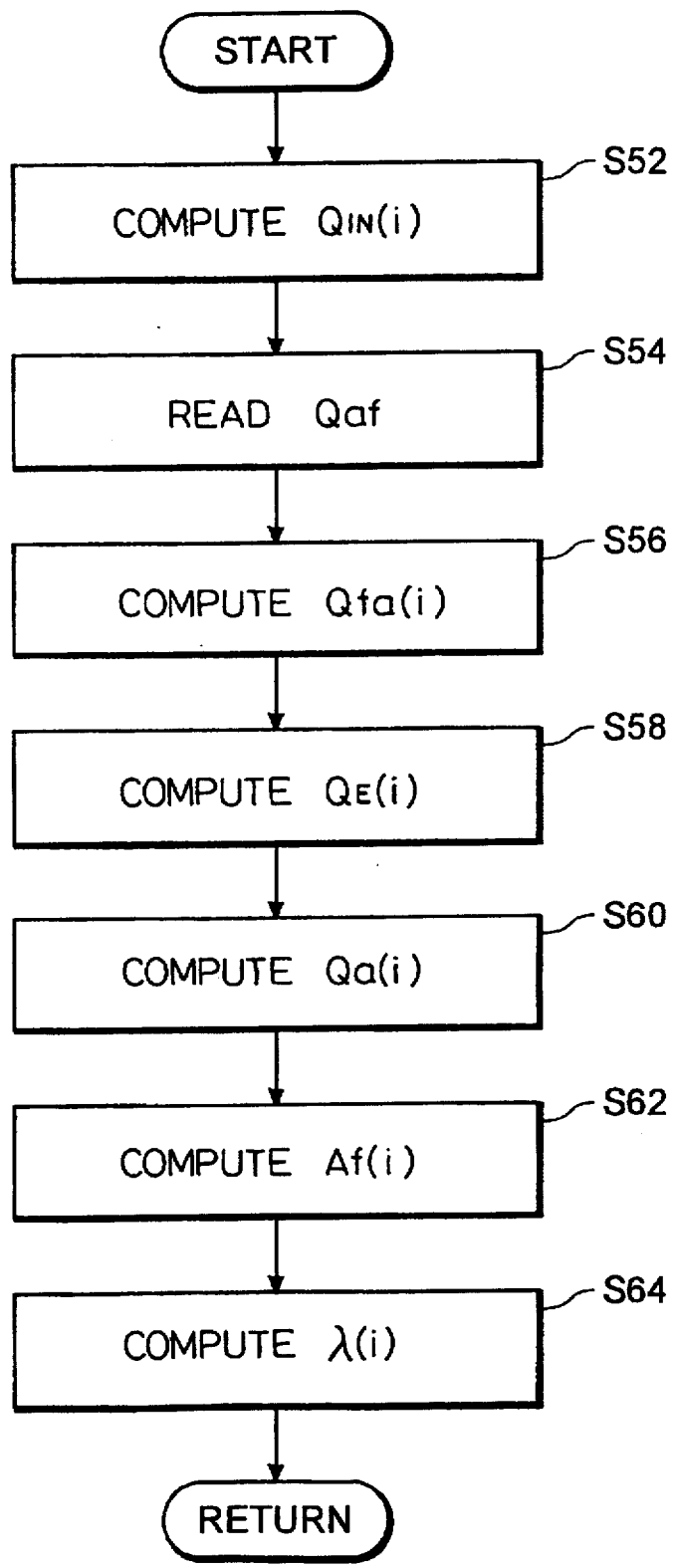
FIG. 7 is a flowchart showing a procedure for an excess air rate detection subroutine executed in the engine control system shown in FIG. 6.

If the predetermined conditions are met after the driver turns on the ignition key to start the engine 1, as in the case of the first embodiment, the ECU 8 repeatedly executes an excess air rate detection subroutine shown in the flowchart of FIG. 7 with every stroke of the engine 1. When this subroutine is started, the ECU 8 computes, in Step S52, the total intake quantity $Q_{IN}(i)$ on the basis of the respective outputs of the intake-air temperature sensor 16, boost pressure sensor 17, etc., according to the aforesaid equation (M1), as in Step S2 of FIG. 3.

Then, after reading the intake air quantity Qaf detected by the airflow sensor 18, in Step S54, it computes an actual in-cylinder intake air quantity Qfa(i) according to the following equation (L1), in Step S56, in consideration of a delay in transportation time before an intake air passed through the airflow sensor 18 is sucked into the cylinder.

$$Qfa(i)=k*Qfa(i-1)+(1-k)*Qaf, \tag{L1}$$

where Qfa(i−1) is the preceding value of the actual in-cylinder intake air quantity, and k (0<k<1) is a relaxation coefficient obtained by using a surge tank model.

Then, in Step S58, the ECU 8 computes the EGR quantity $Q_E(i)$ on the basis of the total intake quantity $Q_{IN}(i)$ and the actual in-cylinder intake air quantity Qfa(i), according to the following equation (L2).

$$Q_E(i)=Q_{IN}(i)-Qfa(i). \tag{L2}$$

When the EGR quantity $Q_E(i)$ is obtained, the ECU 8 then computes the equivalent intake air quantity Qa(i) by adding the quantity of unburned air (quantity of residual air) in the EGR gas to the in-cylinder intake air quantity Qfa(i) in Step S60. In the following, $\lambda(i-3)$ is the estimated excess air rate for the last stroke but two, and is set at a predetermined value (e.g., 1.2) until a second process (i.e., second stroke) since the start of the subroutine.

$$Qa(i)=Qfa(i)+(1-1/\lambda(i-3))*Q_E(i). \tag{L3}$$

Then, the ECU 8 computes a present air-fuel ratio Af(i) on the basis of the equivalent intake air quantity Qa(i) thus obtained and the injection quantity Qf, according to the following equation (L4), in Step S62.

$$Af(i) = Qa(i)/Qf \qquad (L4)$$

After finishing computing the air-fuel ratio Af(i), the ECU 8 finally advances to Step S64, whereupon it computes the present excess air rate λ(i) according to the aforesaid equation (M7) in the same manner as in Step S12 of FIG. 3. Thereafter, the ECU 8 returns to START and repeats the detection of the excess air rate. When the present excess air rate λ(i) is computed in this manner, the ECU 8 is expected only to control the operation of the EGR valve 31 by executing the EGR control subroutine shown in the flowcharts of FIGS. 4 and 5, in the same manner as in the first embodiment.

Thus, also in the second embodiment, the excess air rate is estimated from the intake air quantity, boost pressure, fuel injection quantity, etc., so that the excess air rate can be detected accurately and rapidly without using any expensive sensors, such as an LAFS. By controlling the operation of the EGR valve 31 in accordance with the detected excess air rate, moreover, the EGR gas can be appropriately recirculated even at the time of acceleration or deceleration, so that the delivery of black smoke or NOx can be restrained to an extremely low level.

The following is a description of a third embodiment of the present invention.

Since the outline of an engine control system according to the third embodiment is identical with that of the first embodiment shown in FIG. 2, a description of the same is omitted. The excess air rate control according to the third embodiment is carried out in the following manner.

Figure 8:
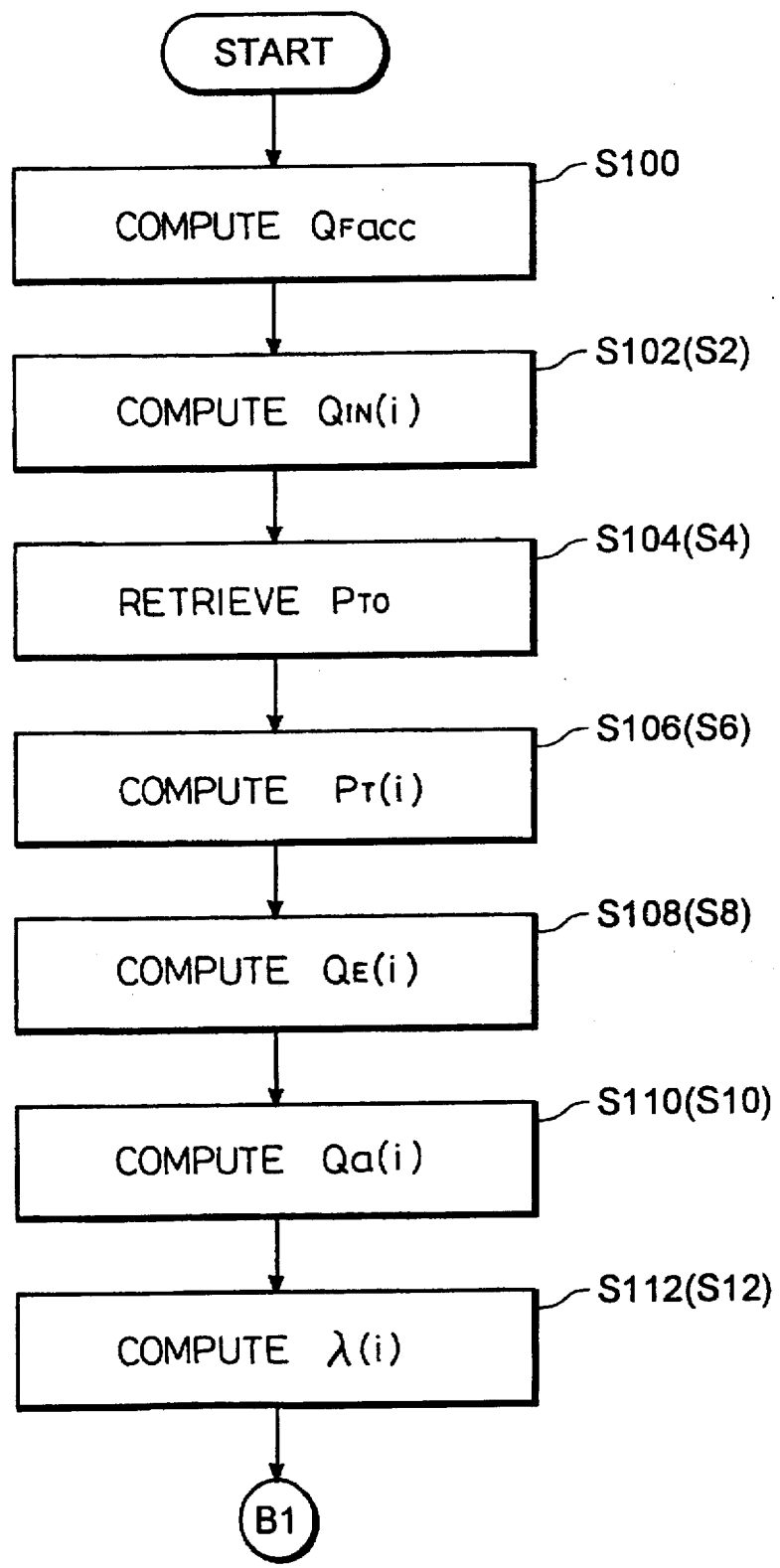
FIG. 8 is part of a flowchart showing a control procedure for an excess air rate control subroutine according to another mode of the present invention.

If the same predetermined conditions as the ones described in connection with the first embodiment are met after the engine 1 is started, the ECU 8 repeatedly executes an excess air control subroutine shown in the flowcharts of FIGS. 8 to 10 with every stroke of the engine 1. When this subroutine is started, the ECU 8 first retrieves, in Step S100 of FIG. 8, an accelerator-directed fuel quantity $Q_F$acc (cc/stroke) from the map of FIG. 11 in accordance with accelerator opening degree information θacc (%) and the engine rotation speed Ne (rpm) delivered from the electronic governor 5 and the Ne sensor 10, respectively.

Then, in Step S102, the ECU 8 computes the present total intake quantity $Q_{IN}$(i) (g/stroke) for the engine 1 on the basis of the respective outputs of the intake-air temperature sensor 16, boost pressure sensor 17, etc., according to an equation similar to the aforesaid equation (M1). Then, in Step S104, the ECU 8 retrieves the steady-state upstream-side turbine pressure value $P_{T0}$ from the map (not shown) in accordance with the engine rotation speed Ne and the accelerator-directed fuel quantity $Q_F$acc, and in Step S106, computes the present upstream-side turbine pressure $P_T$(i) according to the same procedure as the one described in connection with Step S6 of FIG. 3. When the upstream-side turbine pressure $P_T$(i) is obtained, the ECU 8 computes the present EGR quantity $Q_E$(i) (g/stroke) according to the aforesaid equation (M5) in Step S108, in the same manner as in Step S8 of FIG. 3. When the EGR quantity $Q_E$(i) is obtained, the ECU 8 then computes the equivalent intake air quantity Qa(i), which is obtained by converting the total intake quantity $Q_{IN}$(i) into an intake air, in Step S110, in the same manner as in Step S10 of FIG. 3.

Then, in Step S112, the ECU 8 computes the present estimated excess air rate λ(i) from the equivalent intake air quantity Qa(i) and the accelerator-directed fuel quantity $Q_F$acc, according to an equation similar to the aforesaid equation (M8).

$$\lambda(i) = Qa(i)/(Q_{Facc} * 14.5).$$

Figure 9:
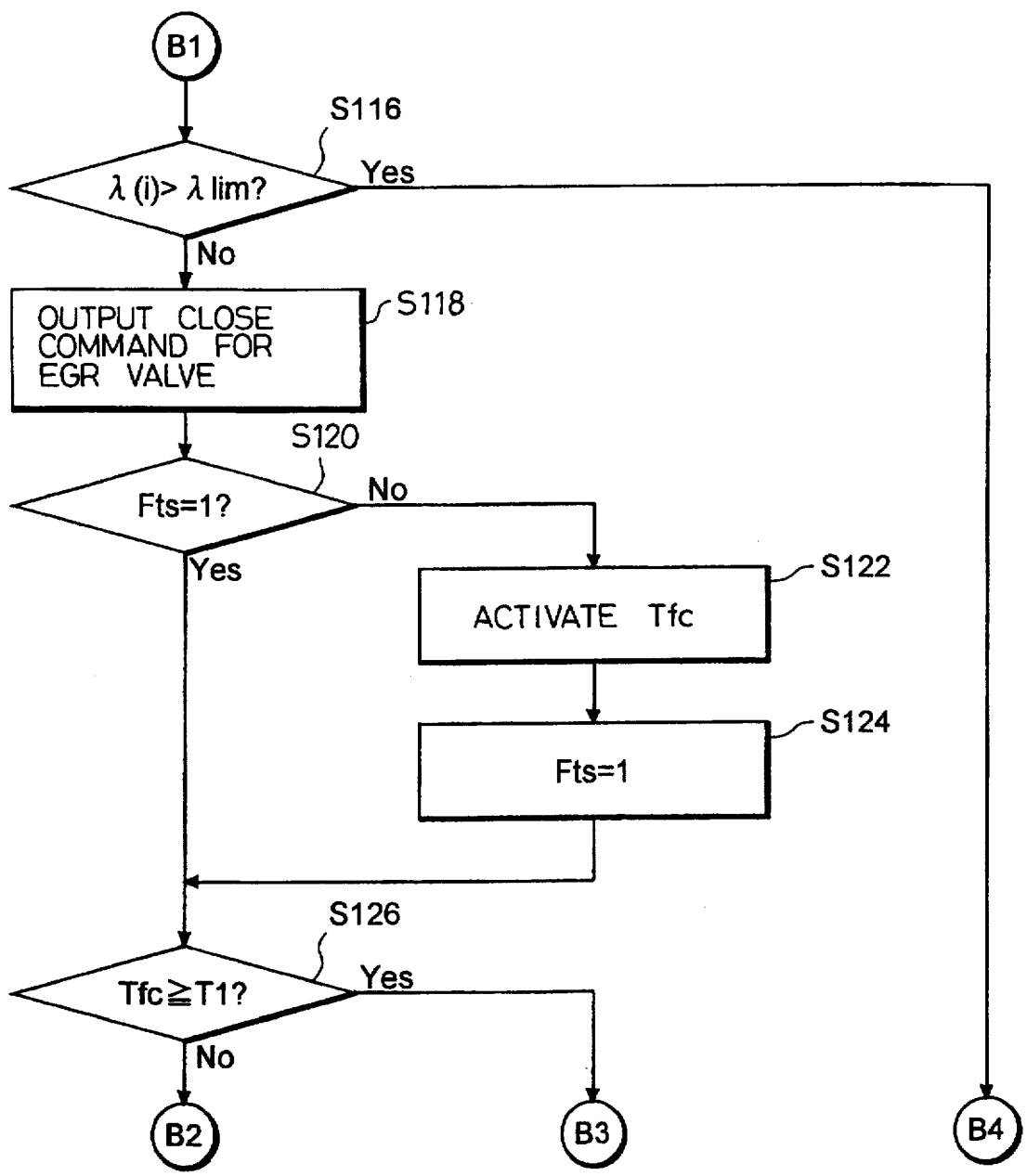
FIG. 9 is part of the flowchart for the excess air rate control procedure, continued from the flowchart of FIG. 8.

Then, the ECU 8 determines, in Step S116 of FIG. 9, whether or not the present estimated excess air rate λ(i) is higher than an excess air rate lower limit value λlim (1.5 for the case of the present mode of operation). If the accelerator-directed fuel quantity $Q_F$acc increases at the time of acceleration so that the decision in this step becomes No, the ECU 8 outputs a command for, closing the EGR valve 31 in Step S118. In response to the closing command, a negative pressure is introduced into the negative-pressure chamber 35 of the EGR valve 31, so that the valve body 32 is actuated in the closing direction. Since it takes a certain time for the valve body 32 to be fully closed, the introduction of the EGR gas is stopped gradually.

After outputting the closing command in Step S118, the ECU 8 then determines whether or not a timer-set flag Fts is 1 in Step S120. The timer-set flag Fts is a flag that indicates whether or not a fuel limiting timer Tfc (mentioned later) is activated, and is reset at 0 when the ignition key is turned on.

The first decision in Step S120 is No. After the ECU 8 then activates the fuel limiting timer Tfc for determining the period for fuel limiting in Step S122, therefore, it sets the timer-set flag Fts at 1 in Step S124. Then, the ECU 8 determines whether or not a predetermined time T1 is exceeded by the value in the fuel limiting timer Tfc in Step S126. If the decision in this step is No, the ECU 8 keeps a present injection quantity $Q_{FI}$(i) at a preceding value $Q_{FI}$(i−1) in Step S128 of FIG. 10, and then actuates the electronic governor 5 to effect fuel injection in Step S130. Thereupon, the excess air rate λ is maintained as it is, and harmful exhaust gas components can be prevented from increasing.

Figure 10:
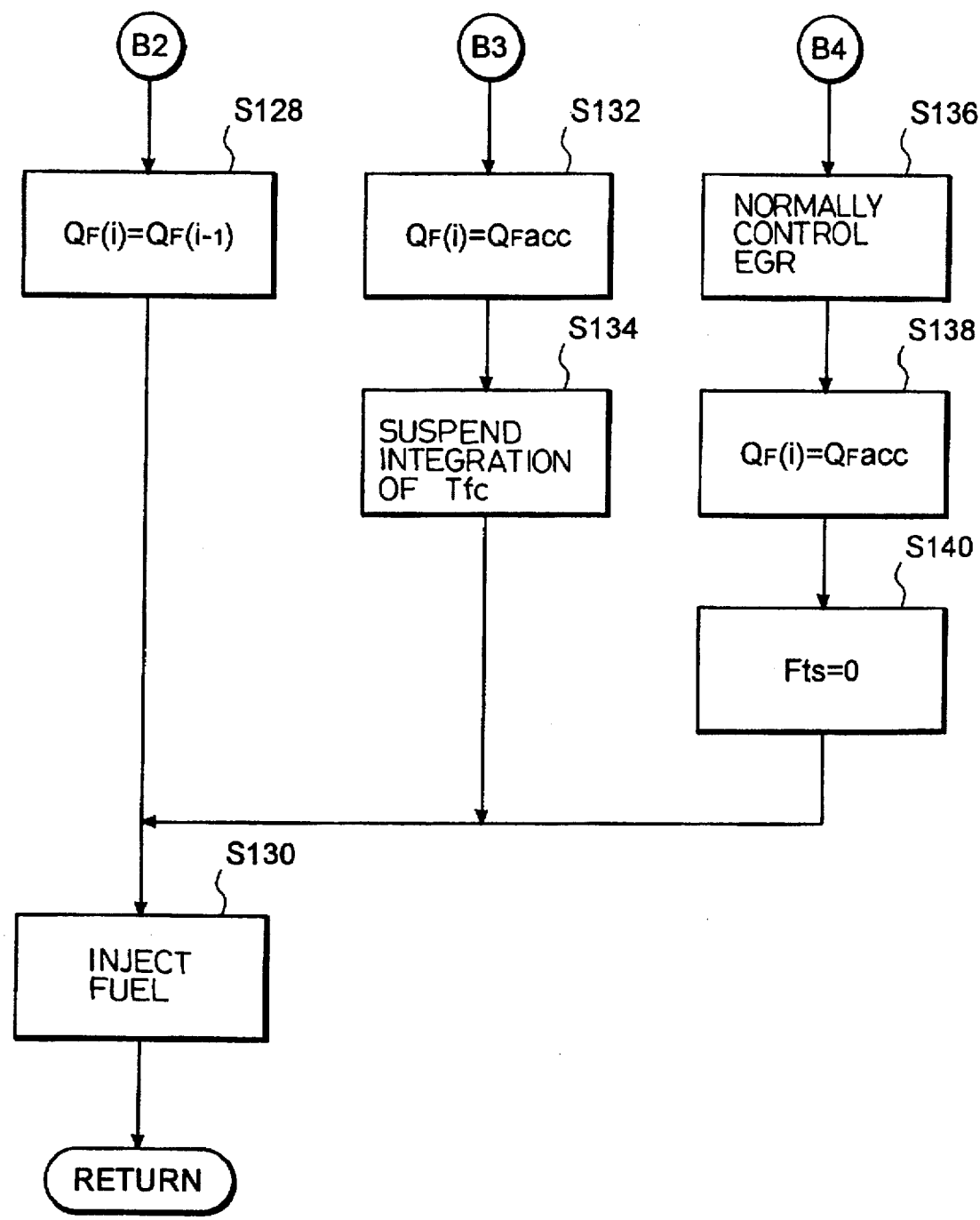
FIG. 10 is the remainder of the flowchart for the excess air rate control procedure, continued from the flowchart of FIG. 9.
Figure 11:
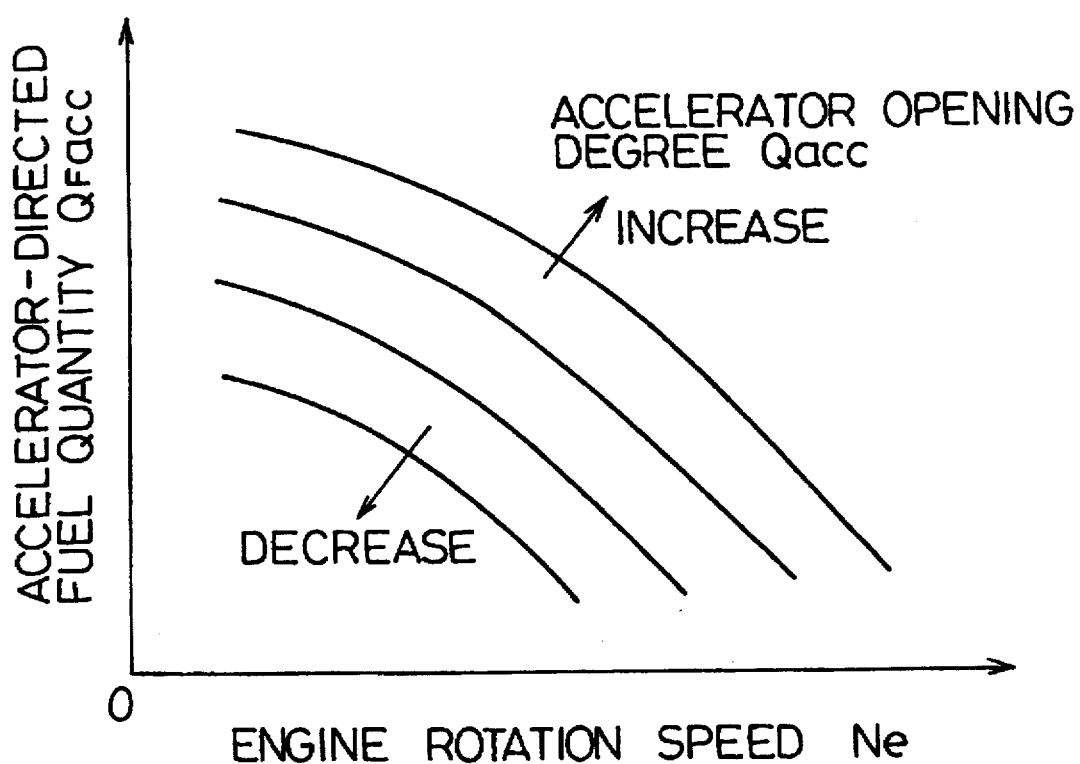
FIG. 11 is a graph for conceptually illustrating an arrangement of a map with which an accelerator-directed fuel quantity is obtained from an accelerator opening degree and engine rotation speed, showing the relationships between the accelerator opening degree, engine rotation speed, and accelerator-directed fuel quantity.

If the predetermined time T1 is exceeded by the value in the fuel limiting timer Tfc so that the decision in Step S126 is Yes, the ECU 8 adjusts the present injection quantity $Q_{FI}$(i) to the aforesaid accelerator-directed fuel quantity $Q_F$acc in Step S132 of FIG. 10. Then, the ECU 8 stops the integration in the fuel limiting timer Tfc in Step S134, and actuates the electronic governor 5 to effect fuel injection in Step S130. The predetermined time T1 is set at a value large enough for the EGR valve 31 to be fully closed. At this point of time, the exhaust pressure ceases to flow out into the suction system, and the supercharge pressure increases in a very short time. As the injection quantity increases, therefore, the generated torque increases, so that the driver's intended acceleration is effected. Also, the excess air rate λ cannot be substantially lowered by the increase of the intake, and the increase of the harmful exhaust gas components can be restricted to a negligible degree.

If the estimated excess air rate λ(i) becomes higher with the increase of the intake air or the like so that the decision in Step S116 is Yes, on the other hand, the ECU 8 restores the operation control for the EGR valve 31 to a normal state in Step S136 of FIG. 10, and then sets the accelerator-directed fuel quantity $Q_F$acc for the present injection quantity $Q_{FI}$(i) in Step S138. Then, after the ECU 8 resets the timer-set flag Fts at 0 in Step S140, it actuates the electronic governor 5 to effect fuel injection in Step S130. In this manner, normal fuel injection control and EGR control can be carried out with improved outputs and fuel efficiency and reduced NOx.

Thus, according to the mode of operation described above, the injection quantity is limited and the introduction of the EGR gas is stopped as the excess air rate is lowered, so that the increase of the harmful exhaust gas components can be restrained while maintaining accelerating force to the utmost.

According to the third embodiment, the EGR valve is fully closed when the excess air rate is deviated from a predetermined range. Alternatively, however, the valve opening degree may be restricted to 50% or thereabout, for example. According to the mode of operation described above, moreover, the injection quantity is switched at once to the accelerator-directed fuel quantity in a predetermined time after the estimated excess air rate falls below the excess air rate lower limit value. Alternatively, however, this switching may be carried out gradually.

The following is a description of a fourth embodiment of the present invention.

The outline of an engine control system according to the fourth embodiment is identical with that of the first embodiment shown in FIG. 2, and the excess air rate control according to the fourth embodiment is carried out in the following manner.

In the fourth embodiment, the ECU 8 obtains the present estimated excess air rate $\lambda(i)$ by executing the procedures from the one for obtaining the accelerator-directed fuel quantity $Q_F$acc (cc/stroke) to the one for obtaining the present estimated excess air rate $\lambda(i)$, which are similar to the procedures of Steps S100 to S112 of the third embodiment. Then, the ECU 8 advances to Step S146 of FIG. 12, whereupon it determines whether or not the present estimated excess air rate $\lambda(i)$ obtained in the aforesaid manner is higher than the excess air rate lower limit value $\lambda$lim (1.5 for the case of the present mode of operation). If the accelerator-directed fuel quantity $Q_F$acc increases at the time of acceleration so that the decision in this step becomes No, the ECU 8 computes a present target injection quantity $Q_{FT}(i)$ according to the following equation (K1) in Step S148. If fuel injection is carried out in accordance with this target injection quantity $Q_{FT}(i)$, the actual excess air rate $\lambda$ is equal to the excess air rate lower limit value $\lambda$lim, and the increase of the harmful exhaust gas components can be prevented.

$$Q_{FT}(i)=Q_{Facc}\cdot(\lambda(i)/\lambda lim). \tag{K1}$$

If the estimated excess air rate $\lambda(i)$ is so high that the decision in Step S146 is Yes, moreover, the ECU 8 sets the accelerator-directed fuel quantity $Q_F$acc itself for the present target injection quantity $Q_{FT}(i)$ in Step S150.

When the present target injection quantity $Q_{FT}(i)$ is obtained in Step S148 or S150, the ECU 8 then retrieves, in Step S152, a target excess air rate $\lambda$ target from a map (not shown) in accordance with the engine rotation speed Ne and the accelerator-directed fuel quantity $Q_F$acc obtained previously. This retrieve is carried out by a method similar to that for Step S22 of FIG. 4.

In Step S154, thereafter, the ECU 8 computes a deviation $\Delta\lambda$ between the target excess air rate $\lambda$ target and the estimated excess air rate $\lambda(i)$, following the same procedures of Steps S24 to S38 of FIG. 4. Since both the target excess air rate $\lambda$ target and the estimated excess air rate $\lambda(i)$ are obtained in accordance with the accelerator-directed fuel quantity $Q_F$acc, the deviation $\Delta\lambda$ has a relatively large value even in the case where the target injection quantity $Q_{FT}(i)$ is reduced in Step S118.

After finishing the computation of the deviation $\Delta\lambda$, the ECU 8 computes the proportional term $E_{PP}$ for EGR control by using the proportional gain $K_P$ in Step S156, sets the proportional gain $K_I$ at a predetermined value in Step S158, and thereafter, computes the integral term $E_{PI}$ for EGR control in Step S160.

Figure 13:
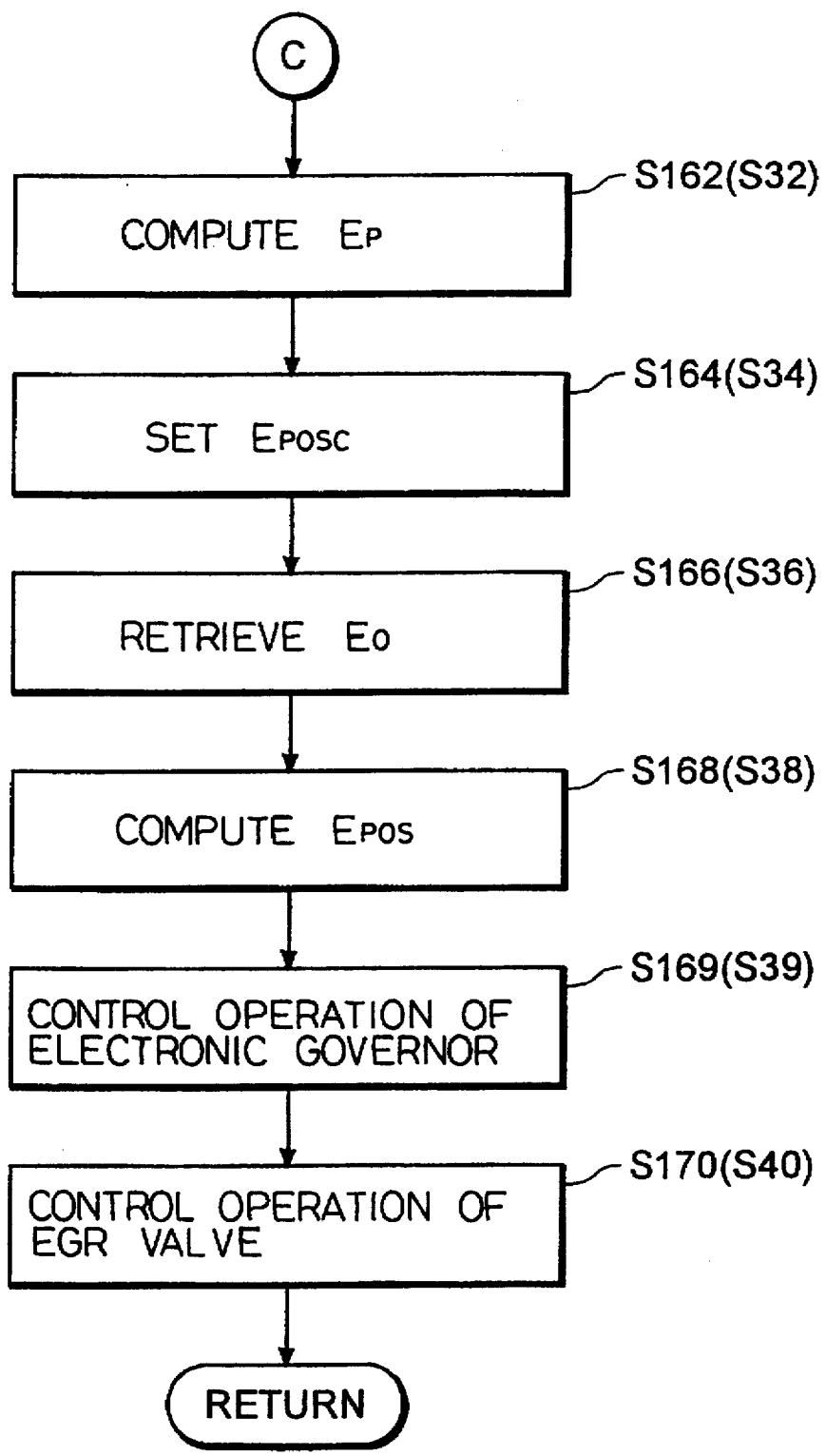
FIG. 13 is the remainder of the flowchart for the excess air rate control procedure, continued from the flowchart of FIG. 12.

After finishing the computation of the proportional term $E_{PP}$ and the integral term $E_{PI}$, the ECU 8 computes the basic correction amount $E_P$ for the EGR valve opening degree in Step S162 of FIG. 13, then carries out the limiting process for clipping the computed basic correction amount $E_P$ at the predetermined upper and lower limit values in Step S164, and sets the opening degree correction amount Eposc for the EGR valve 31. Then, the ECU 8 retrieves the target opening degree Eo of the EGR valve 31 from the map (not shown) in accordance with the engine rotation speed Ne and the target injection quantity $Q_{FT}(i)$ in Step S166, and computes the target EGR valve opening degree Epos in Step S168.

Then, the ECU 8 controls the operation of the electronic governor 5 in accordance with the target injection quantity $Q_{FT}(i)$ in Step S169, and also controls the operation of the EGR valve 31 in accordance with the target EGR valve opening degree Epos in Step S170. Thereafter, the ECU 8 returns to START and repeats the control.

Thus, according to the present mode of operation, the fuel injection control is carried out in a manner such that the actual excess air rate $\lambda$ is clipped at the lower limit value. Therefore, the Generated torque of the engine 1 at the time of acceleration or the like can be increased to the utmost while restraining the increase of the harmful exhaust gas components. On the other hand, the control of the introduction of the EGR gas is carried out in accordance with the deviation $\Delta\lambda$ between the target excess air rate $\lambda$ target and the estimated excess air rate $\lambda(i)$, which is obtained from the accelerator-directed fuel quantity $Q_F$acc, so that the delay in the operation of the EGR valve 31 at the time of acceleration or the like can be compensated, and lowering of the supercharge pressure, which is attributable to an outflow of the exhaust pressure into the suction system, can be reduced.

Although specific modes of operation have been described herein, the present invention is not limited to the aforementioned embodiments. Although the present invention is applied to the turbo-charged diesel engine, according to the embodiment described above, for example, it may be also suitably applied to a lean-burn gasoline engine and the like.

The specific arrangement of the engine control system, control procedures, etc. may be modified without departing from the spirit of the invention.

FIELD OF INDUSTRIAL APPLICATION

The excess air rate detecting apparatus and control apparatus for an engine according to the present invention can be suitably utilized for a diesel engine provided with a turbo charger or a lean-burn gasoline engine, and can detect the excess air rate for the diesel engine or the like accurately and rapidly without using an LAFS or the like, which is poor in reliability and entails high cost. With use of this detecting apparatus, the fuel injection quantity and EGR quantity can be appropriately controlled in order to reduce the delivery of NOx or black smoke.

I claim:

1. In an excess air rate control apparatus for an engine which is mounted in a vehicle and which includes a suction passage and an exhaust gas recirculation system for recirculating part of exhaust gas into the suction passage, the excess air rate control apparatus controlling, in accordance with operating conditions of the engine, an excess air rate of an air-fuel mixture which is supplied to the engine while the exhaust gas recirculation system is operating, the excess air rate control apparatus comprising:

excess air rate estimating means for estimating the excess air rate of the air-fuel mixture supplied to the engine;

target excess air rate setting means for setting a target excess air rate of the air-fuel mixture supplied to the engine;

valve opening degree setting means for setting a target valve opening degree for the exhaust gas recirculation system such as to remove a deviation between the excess air rate estimated by said excess air rate estimating means and the target excess air rate set by said target excess air rate setting means; and an operation control device for controlling operation of the exhaust gas recirculation system in accordance with the target valve opening degree set by said valve opening degree setting means, said valve opening degree setting means setting the target valve opening degree at least by proportional-plus-integral control such that an integral term for the proportional-plus-integral control is not integrated when an absolute value of the deviation between the estimated excess air rate and the set target excess air rate is larger than a predetermined value.

2. An excess air rate control apparatus for an engine according to claim 1, which comprises fuel supply quantity detecting means for detecting a quantity of fuel supply to the engine and engine rotation speed detecting means for detecting a rotation speed of the engine;

wherein said target excess air rate setting means sets the target excess air rate in accordance with the engine rotation speed detected by said engine rotation speed detecting means and the fuel supply quantity set by said fuel supply quantity setting means.

3. In an excess air rate control apparatus for an engine which is mounted in a vehicle and which includes a suction passage, an exhaust passage, a turbo charger for supercharging the engine with intake by driving a turbine by means of exhaust gas of the engine, and an exhaust gas recirculation system for recirculating part of the exhaust gas, taken out of the exhaust passage on an upstream side of the turbo charger, into the suction passage, the excess air rate control apparatus controlling, in accordance with operating conditions of the engine, an excess air rate of that air-fuel mixture which is supplied to the engine while the exhaust gas recirculation system is operating, the excess air rate control apparatus comprising:

intake pressure detecting means for detecting an intake pressure of the engine;

exhaust pressure detecting means for detecting an exhaust pressure of the engine;

exhaust gas recirculation quantity estimating means for estimating a quantity of recirculation of the exhaust gas by the exhaust gas recirculation system in accordance with the intake pressure detected by said intake pressure detecting means and the exhaust pressure detected by said exhaust pressure detecting means;

total intake quantity detecting means for detecting a total intake quantity of the engine, including the quantity of the exhaust gas recirculated by the exhaust gas recirculation system;

equivalent intake air quantity estimating means for estimating an equivalent intake air quantity of the engine;

fuel supply quantity setting means for setting a quantity of fuel supply to the engine in accordance with a depression amount of an accelerator pedal of the vehicle;

fuel supply means for supplying a fuel to the engine in accordance with the fuel supply quantity set by said fuel supply quantity setting means;

excess air rate estimating means for estimating the excess air rate for the engine in accordance with the fuel supply quantity set by said fuel supply quantity setting means and the equivalent intake air quantity estimated by said equivalent intake air quantity estimating means;

storage means for storing the excess air rate estimated by said excess air rate estimating means;

target excess air rate setting means for setting a target excess air rate of the air-fuel mixture supplied to the engine;

valve opening degree setting means for setting a target valve opening degree of the exhaust gas recirculation system in accordance with the excess air rate estimated by said excess air rate estimating means and the target excess air rate set by said target excess air rate setting means; and operation control means for controlling operation of the exhaust gas recirculation system in accordance with the target valve opening degree set by said valve opening degree setting means, said equivalent intake air quantity estimating means for estimating the equivalent intake air quantity in accordance with the total intake quantity detected by said total intake quantity detecting means, the excess air rate stored in said storage means and estimated for a last cycle but a predetermined number of cycles, and the exhaust gas recirculation quantity estimated by said exhaust gas recirculation quantity estimating means.

4. An excess air rate control apparatus for an engine according to claim 3, wherein said fuel supply means injects the fuel directly into a combustion chamber of the engine.

5. An excess air rate control apparatus for an engine according to claim 3, wherein the engine is a diesel engine.

6. An excess air rate control apparatus for an engine according to claim 3, wherein said valve opening degree setting means sets the target valve opening degree such as to remove a deviation between the excess air rate estimated by said excess air rate estimating means and the target excess air rate set by said target excess air rate setting means.

7. An excess air rate control apparatus for an engine according to claim 6, which comprises engine rotation speed detecting means for detecting a rotation speed of the engine, and wherein said target excess air rate setting means sets the target excess air rate in accordance with the engine rotation speed detected by said engine rotation speed detecting means and the fuel supply quantity set by said fuel supply quantity setting means.

8. An excess air rate control apparatus for an engine according to claim 3, which comprises fuel supply quantity correcting means for correcting the fuel supply quantity set by said fuel supply quantity setting means, in accordance with a result of comparison between the excess air rate estimated by said excess air rate estimating means and a predetermined excess air rate;

wherein said fuel supply means supplies the fuel to the engine in accordance with the fuel supply quantity corrected by said fuel supply quantity correcting means.

9. An excess air rate control apparatus for an engine according to claim 8, wherein said fuel supply quantity correcting means corrects the fuel supply quantity set by said fuel supply quantity setting means so that the excess air rate estimated by said excess air rate estimating means approaches the predetermined excess air rate.

10. An excess air rate control apparatus for an engine according to claim 8, wherein said fuel supply quantity correcting means reduces the fuel supply quantity set by said fuel supply quantity setting means when the excess air rate estimated by said excess air rate estimating means is not higher than the predetermined excess air rate.

11. An excess air rate control apparatus for an engine according to claim 8, wherein said fuel supply quantity correcting means corrects the fuel supply quantity in accordance with a value obtained by multiplying the fuel supply quantity, which was set by the fuel supply quantity setting means, by the estimated excess air rate, and then dividing an obtained product by said predetermined excess air rate, when the excess air rate estimated by said excess air rate estimating means is not higher than the predetermined excess air rate.

12. An excess air rate control apparatus for an engine according to claim 3, which comprises decision means for determining whether or not the excess air rate estimated by said excess air rate estimating means is within a predetermined allowable range;

wherein said operation control means actuates the exhaust gas recirculation system in a closing direction when said decision means concludes that the estimated excess air rate is out of the allowable range.

13. An excess air rate control apparatus for an engine according to claim 12, wherein said fuel supply means includes restraining means for restraining an increase of the fuel supply quantity without regard to the depression amount of the accelerator pedal when said decision means concludes that the estimated excess air rate is out of the allowable range.

14. An excess air rate control apparatus for an engine according to claim 13, wherein said storage means stores the fuel supply quantity set for a preceding cycle by said fuel supply quantity setting means; and wherein said restraining means keeps the fuel supply quantity at the preceding value stored in said storage means.

15. An excess air rate control apparatus for an engine according to claim 13, wherein said restraining means releases the fuel supply quantity from the restraint after passage of a predetermined period since a start of the actuation of the exhaust gas recirculation system in the closing direction.

16. An excess air rate control apparatus for an engine according to claim 13, wherein said restraining means releases the fuel supply quantity from the restraint when said decision means concludes that the estimated excess air rate is restored to the allowable range.

17. In an excess air rate detecting apparatus for an engine which is mounted in a vehicle and which includes a suction passage and an exhaust gas recirculation system for recirculating part of exhaust gas into the suction passage, the excess air rate detecting apparatus repeatedly detecting, in accordance with operating conditions of the engine, an excess air rate of that air-fuel mixture which is supplied to the engine while the exhaust gas recirculation system is operating, the excess air rate detecting apparatus comprising:

intake pressure detecting means for detecting an intake pressure of the engine;

exhaust gas recirculation quantity estimating means for estimating a quantity of recirculation of the exhaust gas by the exhaust gas recirculation system in accordance with at least the intake pressure detected by said intake pressure detecting means;

equivalent intake air quantity estimating means for estimating an equivalent intake air quantity of the engine;

fuel supply quantity setting means for setting a quantity of fuel supply to the engine;

excess air rate estimating means for estimating the excess air rate for the engine in accordance with the fuel supply quantity set by said fuel supply quantity setting means and the equivalent intake air quantity estimated by said equivalent intake air quantity estimating means; and storage means for storing the excess air rate estimated by said excess air rate estimating means, said equivalent intake air quantity estimating means estimating the quantity of recirculation of the exhaust gas in accordance with at least the exhaust gas recirculation quantity estimated by said exhaust gas recirculation quantity estimating means and the excess air rate stored in said storage means and estimated for a last cycle but a predetermined number of cycles.

18. An excess air rate detecting apparatus for an engine according to claim 17, wherein said excess air rate estimating means estimates the excess air rate with every stroke of the engine.

19. An excess air rate detecting apparatus for an engine according to claim 17, wherein the engine is a diesel engine.

20. An excess air rate detecting apparatus for an engine according to claim 17, which comprises total intake quantity detecting means for computing a total intake quantity, including the quantity of the exhaust gas recirculated by the exhaust gas recirculation system, in accordance with the intake pressure detected by said intake pressure detecting means;

wherein said equivalent intake air quantity estimating means estimates an equivalent intake air quantity in accordance with the computed total intake quantity, the excess air rate stored in said storage means and estimated for the last cycle but the predetermined number of cycles, and the exhaust gas recirculation quantity estimated by said exhaust gas recirculation quantity estimating means.

21. An excess air rate detecting apparatus for an engine according to claim 20, wherein said equivalent intake air quantity estimating means estimates the equivalent intake air quantity by dividing the exhaust gas recirculation quantity by the excess air rate, the exhaust gas recirculation quantity being estimated by said exhaust gas recirculation quantity estimating means and the excess air rate being stored in said storage means and estimated for the last cycle but the predetermined number of cycles, thereby obtaining a quantity of consumed air unconcerned in combustion, out of the exhaust gas recirculated in the exhaust gas recirculation system, and by subtracting the obtained consumed air quantity from the computed total intake quantity.

22. An excess air rate detecting apparatus for an engine according to claim 17, which comprises exhaust pressure detecting means for detecting an exhaust pressure of the engine; and wherein said exhaust gas recirculation quantity estimating means estimates the quantity of recirculation of the exhaust gas in accordance with the intake pressure detected by said intake pressure detecting means and the exhaust pressure detected by said exhaust pressure detecting means.

23. An excess air rate detecting apparatus for an engine according to claim 22, which comprises valve opening degree detecting means for detecting a valve opening degree of the exhaust gas recirculation system; and wherein said exhaust gas recirculation quantity estimating means estimates the quantity of recirculation of the exhaust gas further in accordance with the valve opening degree detected by said valve opening degree detecting means.

24. An excess air rate detecting apparatus for an engine according to claim 23, which comprises engine rotation speed detecting means for detecting a rotation speed of the engine;

wherein said exhaust gas recirculation quantity estimating means obtains an orifice factor in accordance with a difference between the exhaust pressure detected by said exhaust pressure detecting means and the intake pressure detected by said intake pressure detecting means, obtains a recirculated exhaust gas temperature coefficient in accordance with the engine rotation speed detected by said engine rotation speed detecting means and the fuel supply quantity set by said fuel supply quantity setting means, and estimates the quantity of recirculation of the exhaust gas in accordance with the valve opening degree detected by said valve opening degree detecting means, the obtained orifice factor, and the obtained recirculated exhaust gas temperature coefficient.

25. An excess air rate detecting apparatus for an engine according to claim 22, wherein the engine is provided with a turbo charger for supercharging the engine with intake by driving a turbine by means of the exhaust gas, and said exhaust pressure detecting means detects the exhaust pressure on an upstream side of the turbine.

26. An excess air rate detecting apparatus for an engine according to claim 25, which comprises engine rotation speed detecting means for detecting a rotation speed of the engine and total intake quantity detecting means for computing a total intake quantity, including a quantity of the exhaust gas recirculated by the exhaust gas recirculation system, in accordance with the intake pressure detected by said intake pressure detecting means;

wherein said storage means stores the exhaust gas recirculation quantity estimated by said exhaust gas recirculation quantity estimating means, the total intake quantity computed by said total intake quantity detecting means, and the exhaust pressure detected by said exhaust pressure detecting means; and wherein said exhaust pressure detecting means obtains a steady-state value of the exhaust pressure on the upstream side of the turbine in accordance with the engine rotation speed detected by said engine rotation speed detecting means and the fuel supply quantity set by said fuel supply quantity setting means, obtains a turbine acceleration pressure in accordance with the obtained steady-state exhaust pressure value, the exhaust gas recirculation quantity and the total intake quantity, the exhaust gas recirculation quantity and the total intake quantity being individually stored in said storage means for the last cycle but the predetermined number of cycles, obtains a turbine load from the obtained turbine acceleration pressure and the obtained steady-state exhaust pressure value, and obtains a present value of the exhaust pressure in accordance with a preceding value of the exhaust pressure stored in said storage means and the obtained turbine acceleration value and the obtained turbine load.

27. An excess air rate detecting apparatus for an engine according to claim 17, which comprises an airflow sensor provided on an upstream side of a position where the exhaust gas is supplied into the suction passage by the exhaust gas recirculation system, the airflow sensor detects a quantity of intake air flowing in the suction passage;

wherein said exhaust gas recirculation quantity estimating means estimates the exhaust gas recirculation quantity in accordance with the intake pressure detected by said intake pressure detecting means and the intake air quantity detected by said airflow sensor.

28. An excess air rate detecting apparatus for an engine according to claim 27, which comprises total intake quantity detecting means for computing a total intake quantity, including the quantity of the exhaust gas recirculated by the exhaust gas recirculation system, in accordance with the intake pressure detected by said intake pressure detecting means;

wherein said exhaust gas recirculation quantity estimating means estimates the exhaust gas recirculation quantity by subtracting the intake air quantity detected by said airflow sensor from the intake quantity computed by said total intake quantity detecting means.

29. An excess air rate detecting apparatus for an engine according to claim 27, wherein said equivalent intake air quantity estimating means estimates an equivalent intake air quantity in accordance with the intake air quantity detected by said airflow sensor, the excess air rate stored in said storage means and estimated for the last cycle but the predetermined number of cycles, and the exhaust gas recirculation quantity estimated by said exhaust gas recirculation quantity estimating means.

30. An excess air rate detecting apparatus for an engine according to claim 27, which comprises in-cylinder intake air quantity estimating means for estimating a quantity of intake air actually sucked into a cylinder in accordance with the intake air quantity detected by said airflow sensor and a delay in transportation time;

wherein said exhaust gas recirculation quantity estimating means estimates the exhaust gas recirculation quantity in accordance with the actual in-cylinder intake air quantity estimated by said in-cylinder intake air quantity estimating means.

31. An excess air rate detecting apparatus for an engine according to claim 30, wherein said storage means stores the in-cylinder intake air quantity estimated by said in-cylinder intake air quantity estimating means; and wherein said in-cylinder intake air quantity estimating means estimates the actual in-cylinder intake air quantity in accordance with a preceding value of the in-cylinder intake air quantity stored in said storage means and a present value of the intake air quantity detected by said airflow sensor.

32. An excess air rate detecting apparatus for an engine according to claim 30, wherein said equivalent intake air quantity estimating means computes a residual air quantity in accordance with the excess air rate and the exhaust gas recirculation quantity, the excess air rate being stored in said storage means and estimated for the last cycle but the predetermined number of cycles and the exhaust gas recirculation quantity being estimated by said exhaust gas recirculation quantity estimating means, and wherein said equivalent intake air quantity estimating means estimates the equivalent intake air quantity by adding the computed residual air quantity to the actual in-cylinder intake air quantity estimated by said in-cylinder intake air quantity estimating means.

* * * * *